(12) United States Patent
Shi et al.

(10) Patent No.: US 11,917,481 B2
(45) Date of Patent: Feb. 27, 2024

(54) LOAD BALANCING METHOD AND APPARATUS

(71) Applicant: HUAWEI TECHNOLOGIES CO., LTD., Shenzhen (CN)

(72) Inventors: Xiaoli Shi, Shanghai (CN); Henrik Olofsson, Kista (SE); Wenjie Peng, Shanghai (CN); Qinghai Zeng, Shanghai (CN); Feng Han, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 418 days.

(21) Appl. No.: 17/215,403

(22) Filed: Mar. 29, 2021

(65) Prior Publication Data

US 2021/0219204 A1 Jul. 15, 2021

Related U.S. Application Data

(63) Continuation of application No. PCT/CN2019/106247, filed on Sep. 17, 2019.

(30) Foreign Application Priority Data

Sep. 29, 2018 (CN) .......................... 201811152773.6

(51) Int. Cl.
*H04W 36/22* (2009.01)
*H04W 4/40* (2018.01)
(Continued)

(52) U.S. Cl.
CPC ............. *H04W 36/22* (2013.01); *H04W 4/40* (2018.02); *H04W 24/08* (2013.01); *H04W 28/086* (2023.05); *H04W 36/08* (2013.01)

(58) Field of Classification Search
None
See application file for complete search history.

(56) References Cited

U.S. PATENT DOCUMENTS

2012/0149362 A1* 6/2012 Tooher .................. H04W 24/10
455/423
2016/0135057 A1* 5/2016 Wang .................... H04L 5/0037
455/454

(Continued)

FOREIGN PATENT DOCUMENTS

CN 105516312 A 4/2016
CN 106559443 A 4/2017
(Continued)

OTHER PUBLICATIONS

3GPP TS 38.423 V15.1.0 (Sep. 2018), "3rd Generation Partnership Project; Technical Specification Group Radio Access Network; NG-RAN; Xn application protocol (XnAP)(Release 15)", 263 pages.

(Continued)

*Primary Examiner* — Nguyen H Ngo
(74) *Attorney, Agent, or Firm* — Maier & Maier, PLLC

(57) ABSTRACT

A load balancing method which includes a first radio access network node that receives load information of a first load type of a second radio access network node, where the first load type includes any one or more of the following: a network slice load, V2X load, and SUL load; and the first radio access network node obtains the load information of the first load type, so that load balancing can be performed based on a load status of a network slice, a load status of a V2X service, or a load status of a UL/SUL.

20 Claims, 6 Drawing Sheets

(51) Int. Cl.
*H04W 24/08* (2009.01)
*H04W 36/08* (2009.01)
*H04W 28/086* (2023.01)

(56) References Cited

U.S. PATENT DOCUMENTS

| | | |
|---|---|---|
| 2017/0303259 A1 | 10/2017 | Lee et al. |
| 2018/0084550 A1 | 3/2018 | Chen et al. |
| 2018/0270699 A1 | 9/2018 | Babaei et al. |
| 2018/0324645 A1* | 11/2018 | Park ................. H04W 36/0055 |
| 2019/0058997 A1* | 2/2019 | Futaki ................. H04W 36/26 |
| 2019/0394783 A1* | 12/2019 | Byun ................. H04W 92/20 |
| 2020/0413472 A1 | 12/2020 | Huang et al. |

FOREIGN PATENT DOCUMENTS

| | | |
|---|---|---|
| CN | 106658352 A | 5/2017 |
| CN | 107071782 A | 8/2017 |
| CN | 108076531 A | 5/2018 |
| CN | 108112087 A | 6/2018 |
| CN | 108259151 A | 7/2018 |
| CN | 108307423 A | 7/2018 |
| CN | 108347751 A | 7/2018 |
| EP | 3 373 611 A1 | 9/2018 |
| GB | 2552844 A | 2/2018 |
| TW | 201733378 A | 9/2017 |
| WO | 2016/209196 A1 | 12/2016 |
| WO | 2017/168364 A1 | 10/2017 |
| WO | 2017/180221 A1 | 10/2017 |
| WO | 2018/164431 A1 | 9/2018 |

OTHER PUBLICATIONS

3GPP TS 38.473 V15.3.0 (Sep. 2018), "3rd Generation Partnership Project; Technical Specification Group Radio Access Network; NG-RAN; F1 application protocol (F1AP)(Release 15)", 176 pages.

3GPP TR 37.816 V16.0.0 (Jul. 2019), 3rd Generation Partnership Project; Technical Specification Group Radio Access Network; Study on RAN-centric data collection and utilization for LTE and NR (Release 16), 35 pages.

3GPP TR 21.915 V0.3.0 (Sep. 2018), 3rd Generation Partnership Project; Technical Specification Group Services and System Aspects; Release 15 Description; Summary of Rel-15 Work Items (Release 15), 91 pages.

3GPP TS 23.501 V15.3.0 (Sep. 2018), 3rd Generation Partnership Project; Technical Specification Group Services and System Aspects; System Architecture for the 5G System; Stage 2 (Release 15), 226 pages.

Iaesi, Thales, Fairspectrum, VTT, 3GPP TSG-RAN WG3 Meeting #Ad-Hoc, R3-170092, RRM functions pertinent to DU, Spokane, Washington, USA, Jan. 17-19, 2017, 3 pages.

\* cited by examiner

LOAD BALANCING METHOD AND APPARATUS

CROSS-REFERENCE TO RELATED APPLICATIONS

This application is a continuation of International Application No. PCT/CN2019/106247, filed on Sep. 17, 2019, which claims priority to Chinese Patent Application No. 201811152773.6, filed on Sep. 29, 2018. The disclosures of the aforementioned applications are herein incorporated by reference in their entireties.

TECHNICAL FIELD

The embodiments relate to the field of communications technologies, and in particular, to a load balancing method and apparatus.

BACKGROUND

A load balancing function defined in LTE means that eNBs automatically adjust mobility-related parameters by exchanging load information, to implement even distribution of services or terminal devices between different eNBs.

In a new radio (NR) system, a supplementary uplink (SUL) is introduced. To be specific, one downlink (DL) carrier and two uplink carriers that are separately a normal uplink (UL) carrier and a SUL carrier exist between a network device (for example, a base station or a transmission/reception point) and a terminal device. Correspondingly, a SUL threshold is further introduced. To be specific, when the terminal device performs initial random access, the terminal device compares a measured signal strength with a UL threshold and the SUL threshold, to determine whether to perform uplink transmission with the network device by using a UL or the SUL. In a handover scenario, the network device may indicate, via radio resource control (RRC) signaling, the terminal device to use the UL and/or the SUL after being handed over to a new cell.

A vehicle to everything (V2X) service is further introduced in the NR system. V2X is a key technology of a future intelligent transportation system. V2X applications may include vehicle-to-vehicle, vehicle-to-roadside infrastructure, vehicle-to-pedestrian, vehicle-to-application server, and the like. V2X applications can improve driving safety, reduce traffic congestion and vehicle energy consumption, improve traffic efficiency and in-vehicle entertainment information, and the like.

In addition, a concept of network slice (NS) is further introduced in the NR system, to cope with an application scenario in which different communication services have different network performance requirements. The network slice may be a complete end-to-end network that includes a terminal device, an access network, a transport network, a core network, and an application server, can provide a complete communication service, and has a network capability. Alternatively, the network slice may be any combination of the terminal device, the access network, the transport network, the core network, and the application server.

In an existing load balancing method, only an overall load status of a base station (or a cell) is considered, which is relatively coarse-grained. Therefore, the existing load balancing method is not applicable to the NR system.

SUMMARY

Embodiments provide a load balancing method and apparatus, to implement relatively fine-grained load balancing.

According to a first aspect, an embodiment provides a load balancing method, including the following.

A first radio access network node receives a first message from a second radio access network node, where the first message includes load information of a first load type of the second radio access network node, and the first load type includes any one or more of the following: network slice load, vehicle-to-everything V2X load, and supplementary uplink (SUL) load; and the first radio access network node obtains the load information of the first load type.

The first radio access network node obtains the load information of the first load type. In the foregoing method, the first radio access network node performs processing, that is, performs load balancing, based on the obtained load information of the first load type of the second radio access network node. In the load balancing method provided in this embodiment, the network slice load, the V2X load, and UL/SUL load are all considered. Compared with an existing load balancing method, the load information that is considered is load information with a relatively fine granularity, so that load balancing can be performed based on a load status of a network slice (group), a load status of a V2X service, or a load status of a UL/SUL. This method can meet a load balancing requirement in an NR system or another future system, and helps improve a success rate of load balancing and system efficiency.

In a possible implementation, the first radio access network node sends first information to the second radio access network node, where the first information is used to obtain the load information of the first load type of the second radio access network node. In the foregoing embodiment, the first radio access network node may first send, to the second radio access network node, a request for obtaining the load information of the first load type. After receiving the request, the second radio access network node sends the load information of the first load type to the first radio access network node. Further, the first radio access network node may not send the first information, and the second radio access network node may actively report the load information of the first load type to the first radio access network node according to a protocol.

In a possible implementation, the first information further includes a sending periodicity of the load information of the first load type; or the first information further includes a trigger condition for sending the load information of the first load type.

In a possible implementation, load information of the network slice load includes: an identifier of a single network slice and a load status of the single network slice, and/or an identifier of a network slice group and a load status of the network slice group; and/or load information of the V2X load includes V2X frequency information, and the load information of the V2X load further includes any one or more of the following: a load status of V2X corresponding to the V2X frequency information on an air interface, a load status of a V2X service corresponding to the V2X frequency information on a sidelink, and load statuses of V2X services having same quality of service QoS; and/or load information of the SUL load includes: a frequency of the supplementary uplink and load of the supplementary uplink.

In a possible implementation, the load information includes a measurement result of any one or more of the following measurement objects: a quantity of accessed terminal devices, hardware load, transmission load, a reference signal received power measurement report, a radio resource status, ABS status information, an available resource, a channel state information report, and access cell control information.

In a possible implementation, the measurement result includes a measured value and/or overload indication information.

In a possible implementation, that the first radio access network node performs processing based on the load status of the first type includes: the first radio access network node sends a second request to the second radio access network node, where the second request is used to request to hand over a terminal device served by the first radio access network node to the second radio access network node, the second request includes indication information of the first load type, and the indication information of the first load type is used to indicate a cause for the handover. When sending the request used for requesting to the second radio access network node, the first radio access network node adds the indication information of the first load type to the request, so that the second radio access network node determines, based on the current load information of the first load type of the second radio access network node, whether to receive the terminal device from the first radio access network node, thereby helping increase a handover success rate.

In a possible implementation, the first radio access network node is a centralized unit (CU), and the second radio access network node is a distributed unit (DU), or the first radio access network node is a DU, and the second radio access network node is a CU; and the CU has any one or more of the following protocol layers: a packet data convergence protocol, radio resource control, and a service data adaptation protocol; the DU has any one or more of the following protocol layers: a radio link layer control protocol, a media access control layer, and a physical layer; and the CU and the DU belong to a same radio base station.

In a possible implementation, load information of a first load type of the DU includes one or more of the following: a radio resource status of the first load type, an almost blank subframe ABS status of the first load type, a channel state information report of the first load type, and cell access control information of the first load type; or load information of a first load type of the CU includes one or more of the following: hardware load of the first load type, transmission load of the first load type, and a reference signal received power measurement report of the first load type.

In a possible implementation, the first radio access network node is a control plane centralized unit radio access network node CU-CP, and the second radio access network node is a user plane centralized unit radio access network node CU-UP, or the first radio access network node is a user plane centralized unit radio access network node CU-UP, and the second radio access network node is a control plane centralized unit radio access network node CU-CP; and the CU-CP and the CU-UP belong to a same radio base station.

In a possible implementation, load information of a first load type of the CU-UP includes hardware load of the first load type and/or transmission load of the first load type; or load information of a first load type of the CU-CP includes one or more of the following: hardware load of the first load type, transmission load of the first load type, and a reference signal received power measurement report of the first load type.

According to a second aspect, an embodiment provides a load balancing method, including the following.

A second radio access network node sends a first message to a first radio access network node, where the first message includes load information of a first load type, and the first load type includes any one or more of the following: network slice load, vehicle-to-everything V2X load, and SUL load.

In a possible implementation, the method further includes: the second radio access network node receives first information from the first radio access network node, where the first information is used to obtain the load information of the first load type of the second radio access network node.

In a possible implementation, the first information further includes a sending periodicity of the load information of the first load type; or the first information further includes a trigger condition for sending the load information of the first load type.

In a possible implementation, load information of the network slice load includes: an identifier of a single network slice and a load status of the single network slice, and/or an identifier of a network slice group and a load status of the network slice group; and/or load information of the V2X load includes V2X frequency information, and the load information of the V2X load further includes any one or more of the following: a load status of V2X corresponding to the V2X frequency information on an air interface, a load status of a V2X service corresponding to the V2X frequency information on a sidelink, and load statuses of V2X services having same quality of service QoS; and/or load information of the SUL load includes: a frequency of the supplementary uplink and load of the supplementary uplink.

In a possible implementation, the load status includes a measurement result of any one or more of the following measurement objects: a quantity of accessed terminal devices, hardware load, transmission load, a reference signal received power measurement report, a radio resource status, ABS status information, an available resource, a channel state information report, and access cell control information.

In a possible implementation, the measurement result includes a measured value and/or overload indication information.

In a possible implementation, the method further includes: the second radio access network node receives a request from the first radio access network node, where the request is used to request to hand over a terminal device served by the first radio access network node to the second radio access network node, the request includes indication information of the first load type, and the indication information of the first load type is used to indicate a cause for the handover.

In a possible implementation, the first radio access network node is a CU, and the second radio access network node is a DU, or the first radio access network node is a DU, and the second radio access network node is a CU.

The CU has any one or more of the following protocol layers: a packet data convergence protocol, radio resource control, and a service data adaptation protocol; the DU has any one or more of the following protocol layers: a radio link layer control protocol, a media access control layer, and a physical layer; and the CU and the DU belong to a same radio base station.

In a possible implementation, load information of a first load type of the DU includes one or more of the following: a radio resource status of the first load type, an almost blank subframe ABS status of the first load type, a channel state information report of the first load type, and cell access control information of the first load type; or load information of a first load type of the CU includes one or more of the following: hardware load of the first load type, transmission load of the first load type, and a reference signal received power measurement report of the first load type.

In a possible implementation, the first radio access network node is a control plane (CP) centralized unit radio access network node CU-CP, and the second radio access network node is a user plane (UP) centralized unit radio access network node CU-UP, or the first radio access network node is a user plane centralized unit radio access network node CU-UP, and the second radio access network node is a control plane centralized unit radio access network node CU-CP; and the CU-CP and the CU-UP belong to a same radio base station.

In a possible implementation, load information of a first load type of the CU-UP includes hardware load of the first load type and/or transmission load of the first load type; or load information of a first load type of the CU-CP includes one or more of the following: hardware load of the first load type, transmission load of the first load type, and a reference signal received power measurement report of the first load type.

According to a third aspect, an embodiment provides a load balancing method, including the following.

A first radio access network node sends a second message to a second radio access network node, where the second message is used to request the second radio access network node to change a mobility parameter of a first load type of the second radio access network node, and the first load type includes any one or more of the following: network slice load, vehicle-to-everything V2X load, and SUL load; and the second radio access network node changes the mobility parameter of the second radio access network node based on the second message, and sends a response to the first radio access network node.

In a possible implementation, information about the mobility parameter includes handover trigger change information.

In a possible implementation, the message includes information about the mobility parameter that is of the first load type and that is requested to be changed by the second radio access network node.

In a possible implementation, the response includes indication information used to indicate that the second radio access network node successfully changes the mobility parameter; or the response includes a mobility parameter change range of the first load type of the second radio access network node.

In a possible implementation, the network slice load includes load of a single network slice and/or load of a network slice group; and/or the V2X load includes one or more of the following: load of a V2X service on an air interface, load of a V2X service on a sidelink, load of a V2X service on each frequency, load of a V2X service on each frequency on an air interface, load of a V2X service on each frequency on a sidelink, and load of V2X services having same quality of service QoS.

According to a fourth aspect, an embodiment provides a load balancing apparatus, configured to perform the method according to any one of the first aspect or the possible implementations of the first aspect. For example, the load balancing apparatus may include units configured to perform the method according to any one of the first aspect or the possible implementations of the first aspect.

According to a fifth aspect, an embodiment provides a load balancing apparatus, configured to perform the method according to any one of the second aspect or the possible implementations of the second aspect. For example, the load balancing apparatus may include units configured to perform the method according to any one of the second aspect or the possible implementations of the second aspect.

According to a sixth aspect, an embodiment provides a communications system, including the apparatus in the fourth aspect and the apparatus in the fifth aspect.

According to a seventh aspect, an embodiment provides a load balancing apparatus, configured to perform the method according to any one of the third aspect or the possible implementations of the third aspect. For example, the load balancing apparatus may include units configured to perform the method according to any one of the third aspect or the possible implementations of the third aspect.

According to an eighth aspect, an embodiment provides a load balancing apparatus. The apparatus may be the first radio access network node in any possible implementation of the first aspect, or may be a chip disposed in the first radio access network node. The apparatus includes a processor, coupled to a memory and a communications interface, and the processor may be configured to execute an instruction in the memory, to implement the method according to any possible implementation of the first aspect by using the communications interface.

According to a ninth aspect, an embodiment provides a load balancing apparatus. The apparatus may be the second radio access network node in any possible implementation of the second aspect, or may be a chip disposed in the second radio access network node. The apparatus includes a processor, coupled to a memory and a communications interface, and the processor may be configured to execute an instruction in the memory, to implement the method according to any possible implementation of the second aspect by using the communications interface.

According to a tenth aspect, an embodiment provides a communications system, including the apparatus in the sixth aspect and the apparatus in the seventh aspect.

According to an eleventh aspect, an embodiment provides a load balancing apparatus. The apparatus may be the first radio access network node in any possible implementation of the third aspect, or may be a chip disposed in the first radio access network node. The apparatus includes a processor, coupled to a memory and a communications interface, and the processor may be configured to execute an instruction in the memory, to implement the method according to any one possible implementation of the third aspect by using the communications interface.

According to a twelfth aspect, an embodiment provides a computer-readable storage medium, where the computer-readable storage medium stores a computer instruction. When the instruction is run on a computer, the computer is enabled to perform the method according to any one of the first aspect to the third aspect.

According to a thirteenth aspect, an embodiment provides a computer program product including an instruction. When the computer program product runs on a computer, the computer is enabled to perform the method according to any one of the first aspect to the third aspect.

DETAILED DESCRIPTION OF THE EMBODIMENTS

Figure 1:
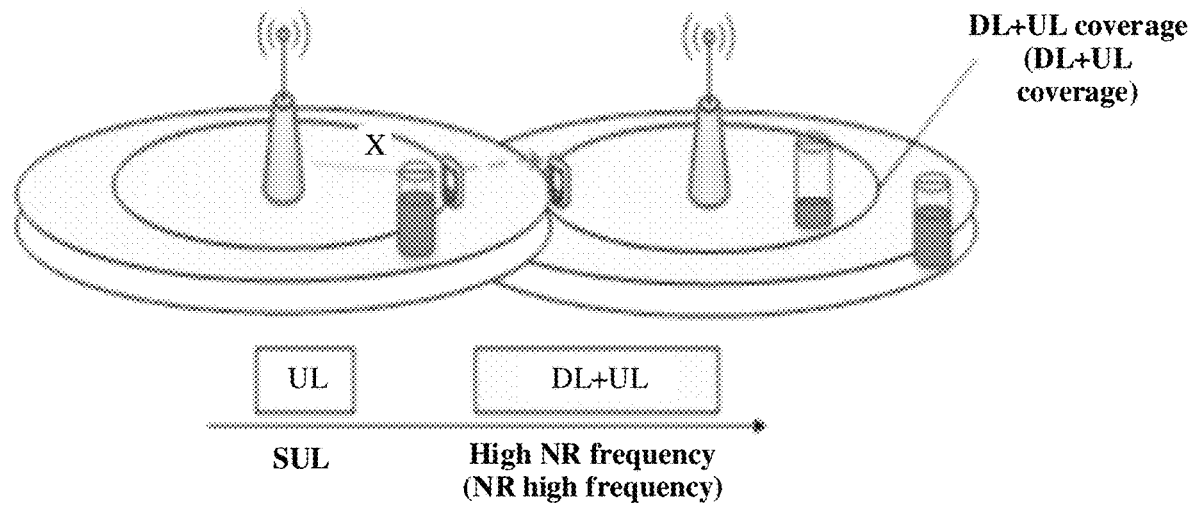
FIG. 1 is a schematic diagram of a UL/SUL scenario according to an embodiment.

To make the objectives, solutions, and advantages clearer, the following further describes the embodiments in detail with reference to the accompanying drawings.

The purpose of load balancing is to control unbalanced service distribution and implement balanced service load distribution between different cells, which ensures a high radio resource utilization rate and increases a system capacity. During the load balancing, it needs to be considered that quality of service (QoS) of an ongoing service after the balancing does not deteriorate, a relatively small call drop rate is maintained, a quantity of handovers and redirections is minimized, and manual intervention is minimized.

The load balancing enables a suitable terminal device to be handed over to a lightly loaded intra-frequency or inter-frequency neighboring cell, thereby relieving load imbalance between cells, improving the service access success rate, improving user experience, and improving a system resource utilization rate.

In an existing load balancing method, a network device optimizes a mobility parameter based on a load status of a current cell and a load status of a neighboring cell. An algorithm is used to determine camping distribution of a terminal device, and a handover of the terminal device is delayed or triggered in advance, to achieve load balance between cells. Service capabilities of different systems are considered. Manual intervention in network management and optimization tasks is minimized. For example, a base station may detect load of the cell, and exchange load information with another base station through an X2 interface, to determine whether it is necessary to perform load transfer to the neighboring cell. The mobility parameter (such as an inter-cell handover parameter or a cell reselection parameter) is changed in a coordinated manner between cells. Based on a cell handover and reselection mechanism, some terminal devices at a cell edge are handed over or reselected to a cell with relatively light load.

The load of the cell may include the following aspects.
1. Air interface load, that is, load on an interface between the network device and the terminal device, may be measured by using a physical resource block (PRB) utilization rate and a quantity of terminal devices in an uplink synchronization state.
2. Hardware load may be measured by using a baseband processing unit central processing unit (CPU) utilization rate and a digital signal processor (DSP) utilization rate. Optionally, utilization rates of the CPU and the DSP may be classified based on levels, for example, low load, medium load, high load, and overload (or "over load"), and the load status of the cell is represented by using a level.
3. For transport network layer (TNL) load, the base station may evaluate usage of a width of an S1 interface, for example, evaluate a bandwidth utilization rate, and determine a current level of the transport network layer load. The transport network layer load may also be classified based on levels into light load, medium load, high load, and overload.

During the load balancing, a source cell is a cell that triggers the load balancing and needs to transfer load to other cells, which may also be referred as a serving cell. A target cell is a neighboring cell that receives the load of the source cell. A candidate neighboring cell is an inter-frequency or intra-frequency cell that meets a condition for selecting a neighboring cell during the load balancing and that may become the target cell.

However, in an NR system, a concept of UL/SUL is introduced. Therefore, in a handover process of the terminal device, UL and SUL selection in a target base station (or the target cell) is involved, as shown in FIG. 1. Either a UL or a SUL is selected for the terminal device to be handed over to communicate with the target base station, to improve a handover success rate.

Similarly, concepts of network slice and V2X are further introduced in the NR system. Therefore, in the handover process of the terminal device, selection of a target network slice in the target base station and a load status of a V2X service in the target base station also need to be considered.

Additionally, the existing load balancing method may no longer meet a load balancing requirement of the NR system. Therefore, an embodiment provides a load balancing method, to implement relatively fine-grained load balancing, that is, to meet different load requirements for the UL/SUL, the network slice, or different V2X services. The load balancing method provided in this embodiment may be applied to the NR system or another future communications system.

Figure 2:
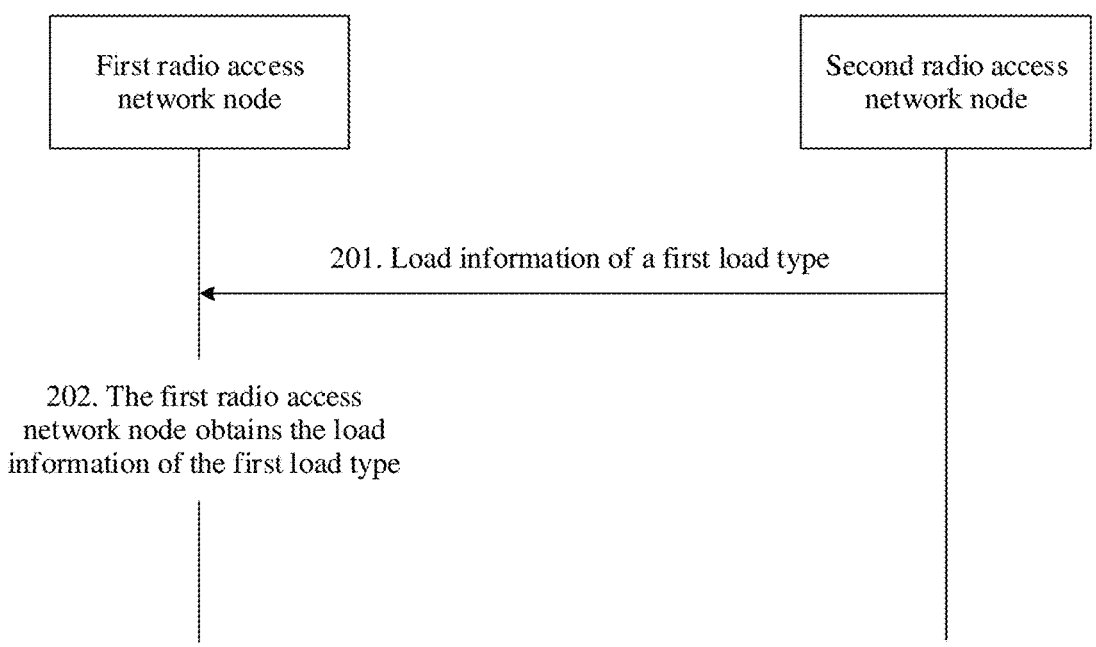
FIG. 2 is a first schematic flowchart of a load balancing method according to an embodiment.

FIG. 2 is a schematic flowchart of a load balancing method according to an embodiment. As shown in the figure, the method may include the following steps.

Step 201: A first radio access network node receives a first message from a second radio access network node, where the first message includes load information of a first load type of the second radio access network node.

The first load type includes any one or more of the following.

Network slice load is a load status in a unit of a network slice or a network slice group. The network slice load may include load of a single network slice and/or load of a network slice group. For example, the second radio access network node may determine load information of each network slice in the second radio access network node, and then send the load information of each network slice to the first radio access network node. For another example, the second radio access network node may determine load information of each network slice group in the second radio access network node, and then send the load information of each network slice group to the first radio access network node. Optionally, the network slice load may further include load of services that are in each network slice (group) and that have a same QoS requirement. For example, the second radio access network node may determine, for each network slice, load information of all services having a same QoS requirement in the network slice, and send the load information to the first radio access network node. In a possible implementation, if the second radio access network node has obtained in advance a network slice supported by the first radio access network node, the second radio access network node may send, to the first radio access network node, load information of a network slice that is in the second radio access network node and that is of the same type as the network slice supported by the first radio access network node. When sending the load information of the network slice load, the second radio access network node may send, to the first radio access network node, an identifier of the network slice (group) and the load information corresponding to the network slice (group).

V2X load is a load status in a unit of a V2X service. The V2X load may further include one or more of the following: total load of V2X services, load of a V2X service on an air interface, load of a V2X service on a sidelink, load of a V2X service on each frequency, load of a V2X service on each frequency on an air interface, load of a V2X service on each frequency on a sidelink, and load of V2X services having a same QoS requirement. For example, the second radio access network node may determine load information of all V2X services that are being provided by the second radio access network node, and send the load information to the first radio access network node. For example, the V2X service may occupy an air interface resource (that is, a link between a network device and a terminal device), or may occupy a resource on a sidelink (that is, a link between terminal devices). The second radio access network node may determine load of the V2X service that occupies the air interface resource, or may determine load of the V2X service that occupies the sidelink resource, and send the load of the V2X service to the first radio access network node. For another example, the V2X service may use one or more frequencies. The second radio access network node may determine, for each frequency used by the V2X service, load information of the V2X service working on the frequency, and send the load information to the first radio access network node. For another example, different V2X services may have different QoS requirements. The second radio access network node may determine load information of V2X services having a same QoS requirement, and send the load information to the first radio access network node.

UL/SUL load is a load status in a unit of a UL and/or a SUL. When the second radio access network node may perform uplink transmission with the terminal device on a UL resource and/or a SUL resource, the second radio access network node may separately determine load information of a service when performing the uplink transmission by using a UL and load information of a service when performing the uplink transmission by using a SUL, and send the load information to the first radio access network node. Optionally, the load information of the SUL load may further include load on each frequency of the SUL, that is, the second radio access network node sends frequency information and a load status of the frequency to the first radio access network node.

Step 202: The first radio access network node obtains the load information of the first load type.

In the foregoing method, the first radio access network node performs processing, that is, performs load balancing, based on the obtained load information of the first load type of the second radio access network node. In the load balancing method provided in this embodiment, the network slice load, the V2X load, and the UL/SUL load are all considered. Compared with an existing load balancing method, the load information that is considered is load information with a relatively fine granularity, so that the load balancing can be performed based on the load status of the network slice (group), the load status of the V2X service, or the load status of the UL/SUL. This method can meet a load balancing requirement in an NR system or another future system, and helps improve a success rate of the load balancing and system efficiency.

The load status determined by the second radio access network node for each of the foregoing types may include a measurement result of any one or more of the following measurement objects: a quantity of accessed terminal devices, hardware load (HW load), transport network layer load (TNL load), reference signal received power (for example, a received RSRP measurement report sent by the terminal device), and a radio resource status (for example, physical resource block (PRB) utilization rate, including a total uplink and downlink PRB utilization rate, a PRB utilization rate of an uplink and downlink guaranteed bit rate (GBR) or a non-GBR, an uplink and downlink scheduling control channel element (CCE) utilization rate), an almost blank subframe (ABS) status, an available resource, a channel state (for example, a received channel state information (CSI) report), or an available capacity/resource (CAC).

The quantity of accessed terminal devices may be a quantity of terminal devices in an activated state, a quantity of terminal devices in an idle state, or a quantity of terminal devices in a deactivated state. Further, the accessed terminal devices may alternatively refer to a total quantity of the terminal devices in the foregoing two or three types of states.

In a possible implementation, the measurement result that is obtained by the second radio access network node for the one or more of the foregoing measurement objects and that is sent by the second radio access network node to the first radio access network node may be a specific measured value, a load level, or an overload indication. An example in which the load information sent by the second radio access network node to the first radio access network node includes the measurement result of the PRB utilization rate is used. If the PRB utilization rate exceeds 95%, it indicates overload. If the PRB utilization rate is between 80% and 95%, it indicates high load. If the second radio access network node measures that the PRB utilization rate of the second radio access network node is 90%, which indicates high load but not overload, the second radio access network node may send the measured value of 90% to the first radio access network node, or may send high load level information to the first radio access network node, or may send non-overload indication information to the first radio access network node. If the PRB utilization rate measured by the second radio access network node is 96%, the second radio access network node may send the measured value of 96% to the first radio access network node, or may send overload level information to the first radio access network node, or may send overload indication information to the first radio access network node.

Considering that there may be a plurality of configuration numerologies (numerology) in determining the PRB utilization rate, an embodiment further provides a method for determining the PRB utilization rate, that is, the PRB utilization rate may be determined according to the following formula:

$$PRB \text{ utilization rate} = \sum \frac{PRB(i) * \text{Band}(i)}{\text{Band}},$$

where

Band represents a mid-bandwidth occupied by all BWPs included by an accessed network device, Band (i) represents a bandwidth occupied by an $i^{th}$ BWP, PRB (i) represents a PRB utilization rate on the $i^{th}$ BWP, and an algorithm of PRB (i) is similar to an existing PRB algorithm.

In another possible implementation, the second radio access network node may not send a measurement result of each measurement object to the first radio access network node. Instead, the second radio access network node determines, after the measurement of various measurement objects, whether overload occurs based on measurement results of the various measurement objects, and sends indication information indicating the load status to the first radio access network node. For example, it may be stipulated that if one type of overload exists in the measurement results of the measurement objects, it is determined that the second radio access network node is overloaded, and the overload indication information is sent to the first radio access network node. Alternatively, it may be stipulated that if the measurement results of the measurement objects are overload, it is considered that the second radio access network node is overloaded, and the overload indication information is sent to the first radio access network node. Alternatively, it may be stipulated that if there are N or more types of overload in a plurality of measurement objects that need to be measured, it is determined that the second radio access network node is overloaded. In addition, a corresponding weight may be set for each measurement object, to determine, based on the measurement result of each measurement object, whether the second radio access network node is overloaded.

Optionally, if the first load type includes UL load and SUL load, the second radio access network node may separately send measurement results of various measurement objects for a UL and a SUL to the first radio access network node; or may separately send an overload indication for the UL and an overload indication for the SUL. In addition, the second radio access network node may simultaneously measure respective measurement objects for the UL and the SUL, and then sends a unified measurement result to the first radio access network node; or may send unified indication information indicating a load status of the UL and the SUL, but does not need to separately send an indication for a load status of the UL and an indication for a load status of the SUL, that is, if the indication information indicates overload, it indicates that the UL and the SUL are overloaded.

In addition, for network slice load, the second radio access network node may further send a network slice overload indication obtained from a core network to the first radio access network node.

In a possible implementation, the first radio access network node may send first information to the second radio access network node, to obtain the load information of the first load type of the second radio access network node. In other words, after receiving the first information sent by the first radio access network node, the second radio access network node adds the load information of the first load type of the second radio access network node to a response message in response to the first information, and sends the response message to the first radio access network node.

Optionally, the first information may include indication information of the first load type, that is, information used to indicate load information that is of a load type of the second radio access network node and that the first radio access network node requests to obtain. For example, if the first information includes indication information of a network slice or a network slice group, the second radio access network node sends load information of each network slice or each network slice group to the first radio access network node. If the first information includes indication information of a V2X service on an air interface and/or indication information of a V2X service on a sidelink, the second radio access network node sends load information of the V2X service on the air interface and load information of the V2X service on the sidelink to the first radio access network node. If the first information includes indication information of a SUL, the second radio access network node sends load information of the SUL to the first radio access network node. For another example, if the first information does not include the indication information of the first load type, it may be considered that the first radio access network node requests to obtain load information of each type, that is, the first load type includes all the foregoing load types; or load information of a default first load type may be sent to the first radio access network node. For example, the network slice load, the V2X load, and the UL/SUL load that are with a relatively coarse granularity may be set as the default first load type.

Optionally, the first information may further include a measurement object, that is, the second radio access network node measures the measurement object included in the first information for the first load type, and sends a measurement result to the first radio access network node. For example, if the indication information that is of the first load type and that is included in the first information is the SUL load, and the measurement object included in the first information includes the PRB utilization rate, the second radio access network node measures a PRB utilization rate of a SUL, and the load information that is of the first load type and that is sent by the second radio access network node to the first radio access network node includes a measurement result of the PRB utilization rate of the SUL.

In some embodiments, the first information may further indicate the second radio access network node to periodically send the load information to the first radio access network node, that is, the first information may further include periodicity information. For example, the first radio access network node may request the second radio access network node to send the load information of the first load type to the first radio access network node every five minutes, and the first information includes indication information used to indicate that a sending periodicity is five minutes. Optionally, different measurement objects may have different periodicity information.

In some other embodiments, the first information may also indicate the second radio access network node to send the load information to the first radio access network node when a trigger condition is met, that is, the first information may include the trigger condition information. The trigger condition may include that the load information of the first load type reaches a threshold, load of the first load type reaches a preset load level, a load level of the first load type changes, or the like. For example, if the first load type is the network slice load, the trigger condition may be that a network slice granularity event such as a load level change of the network slice occurs, may be that a PRB utilization rate of a network slice or a measured value of another measurement object reaches a preset threshold, or the like. Optionally, different measurement objects may have different trigger condition information. For example, if the first load type is the network slice load, trigger condition information for different measurement objects (for example, the PRB, the TNL load, and the HW load) is different.

Optionally, the trigger condition may further include a threshold of a difference between a UL and a SUL, that is, the first radio access network node indicates the second radio access network node to report load information of the UL and the SUL when a measured value of a measurement object of the UL and the SUL is greater than or equal to the threshold, or report load information of an uplink carrier with the heavier load in the UL and the SUL.

In addition, the first information may further include a cell identifier requested to be obtained, that is, the second radio access network node sends load information of a cell corresponding to the cell identifier included in the first information to the first radio access network node.

Optionally, the response message sent by the second radio access network node may further include measurement failure indication information, and the measurement failure indication information may include any one or any combination of the following: a cell that fails to be measured, a cause of a measurement failure, a measurement object that fails to be measured, and a load type that fails to be measured. For example, the first information is used to request to obtain the SUL load and the network slice load. For each load type, the PRB utilization rate and the transport network layer load are measured. If the second radio access network node successfully measures the PRB utilization rate, but fails to measure the transport network layer load, the response message sent by the second radio access network node to the first radio access network node may include a measurement result of the PRB utilization rate in a SUL, a measurement result of the PRB utilization rate in a network slice, and measurement failure indication information of the transport network layer load. If the second radio access network node successfully measures both the PRB utilization rate and the transport network layer load that are in the SUL, but fails to measure the PRB utilization rate and the transport network layer load that are in the network slice, the response message sent by the second radio access network node to the first radio access network node may include a measurement result of the PRB utilization rate and a measurement result of the transport network layer load that are in the SUL, and measurement failure indication information of network slice load. If the second radio access network node fails to measure only the transport network layer load in the network slice, the response message sent by the second radio access network node to the first radio access network node may include measurement failure indication information of the transport network layer load in the network slice and a measurement result of measurement that has been implemented successfully.

In a specific embodiment, the first radio access network node may send the first information to the second radio access network node, and information included in the first information may be shown in Table 1. The second radio access network node sends the response message to the first radio access network node based on the first information. The response message includes the load information that is of the first load type and that is requested to be obtained in the first information, as shown in Table 2a, Table 2b, and Table 2c.

TABLE 1

| IE/Group Name Information element/ group name | Semantics description Description |
|---|---|
| Report Characteristics Measurement objects to be reported | PRB, ABS, transport network layer load, and so on |
| Cell To Report Cell report | Cell ID list to which the request applies. List of cells whose load information is requested for reporting |
| >Cell To Report Item Cell report item >>Cell ID Cell ID Reporting Periodicity Sending periodicity | PRB Periodic Sending periodicity of PRB utilization rate TNL Load Ind Periodic Sending periodicity of transport network layer load HW Load Ind Periodic Sending periodicity of hardware load Composite Available Capacity Periodic Sending periodicity of available capacity ABS Status Periodic Sending periodicity of ABS status |
| >S-NSSAI or S-NSSAI list Single network slice selection assistance information or single network slice selection assistance information list | Network slice or network slice list to which the foregoing sending periodicity applies |
| >SUL or UL | SUL or UL that uses the foregoing sending periodicity for sending |
| >V2X frequency V2X service frequency Reporting Event Trigger condition | Frequencies on which load of a V2X service is sent by using the foregoing periodicity PRB threshold PRB utilization rate threshold TNL Load Ind threshold Load threshold of transport network layer HW Load Ind threshold Hardware load threshold Composite Available Capacity threshold CAC threshold ABS Status threshold ABS status threshold |
| >S-NSSAI or S-NSSAI list | Network slice that the foregoing trigger condition applies or network slice list that the foregoing trigger condition applies |
| >SUL or UL | SUL to which the foregoing trigger condition is applied or UL to which the foregoing trigger condition is applied |
| >V2X frequency | Frequencies to which the foregoing trigger condition is applied in a V2X service |

Table 1 is merely an example. Load types included in the first information may be any one or more of the foregoing load types, and measurement objects may also be any one or more of the foregoing measurement objects. This is not limited in the embodiments. The sending periodicity may alternatively be set for each group of load types, or may be a uniform sending periodicity. The trigger condition may alternatively be set for each load type, or the threshold may be replaced with a load level change, an occurrence of overload, or the like. Based on requirements of different scenarios, the first information may include more or less indication information than that in Table 1.

TABLE 2a

| Cell measurement result |
|---|
| >Cell ID Cell ID >slice list >>S-NSSAI >>UE number Quantity of terminal devices >>Hardware Load Indicator Hardware load >>S1 TNL Load Indicator Transport network layer load of the S1 interface |

TABLE 2a-continued

Cell measurement result

>>Radio Resource Status Radio resource status
>>Composite Available Capacity Group CAC group
>>ABS Status ABS status
>>RSRP Measurement Report List RSRP measurement report list
>> CSI Report CSI Report
>>Cell Reporting Indicator Cell reporting indicator Table 2a shows an example of load information that is sent by the second radio access network node and that is of a network slice. As shown in Table 2a, the load information sent by the second radio access network node includes the quantity of accessed terminal devices, the hardware load, the transport network layer load of the S1 interface, the radio resource status, the CAC group, the ABS status, the RSRP measurement report, the CSI report, and the cell reporting indicator that are of the network slice in the network slice list shown in the table. Further, based on different first information, the load information of the network slice may further include more or less load information than that in Table 2a. Optionally, the foregoing table may further include any one or more of the following: a cause of a measurement failure, a measurement object that fails to be measured, and a load type that fails to be measured.

TABLE 2b

Cell measurement result

| | |
|---|---|
| >Cell ID | |
| >UL config | ENUMERATED (none, UL, SUL, UL and SUL, ...) Enumerated (UL, SUL, UL, and SUL) |
| >>UE number | Quantity of terminal devices |
| >>Hardware Load Indicator | Hardware load |
| >>S1 TNL Load Indicator | Transport network layer load of the S1 interface |
| >>Radio Resource Status | Radio resource status |
| >>Composite Available Capacity Group | CAC group |
| >>ABS Status | ABS status |
| >>RSRP Measurement Report List | RSRP measurement report list |
| >>CSI Report | CSI report |
| >>Cell Reporting Indicator | Cell reporting indicator |

Table 2b shows an example of load information that is sent by the second radio access network node and that is of a UL (which may also be a non-UL, a SUL, a UL and SUL). As shown in Table 2b, the load information sent by the second radio access network node includes the quantity of accessed terminal devices, the hardware load, the transport network layer load of the S1 interface, the radio resource status, the CAC group, the ABS status, the RSRP measurement report, the CSI report, and the cell reporting indicator that are of a network slice in a network slice list shown in the table. Further, based on different first information, load information of an uplink carrier may further include more or less load information than that in Table 2b. Optionally, the foregoing table may further include any one or more of the following: a cause of a measurement failure, a measurement object that fails to be measured, and a load type that fails to be measured.

TABLE 2c

Cell measurement result

>Cell ID
>V2X frequency
>>ARFCN

TABLE 2c-continued

Cell measurement result

>>UE number
>>Hardware Load Indicator
>>S1 TNL Load Indicator
>>Radio Resource Status
>>Composite Available Capacity Group
>>ABS Status
>>RSRP Measurement Report List
>>CSI Report
>>Cell Reporting Indicator Table 2c shows an example of load information that is sent by the second radio access network node and that is of the V2X frequency. As shown in Table 2c, the load information sent by the second radio access network node includes the quantity of accessed terminal devices, the hardware load, the transport network layer load of the S1 interface, the radio resource status, the CAC and ABS status, the RSRP measurement report, the CSI report, and the cell reporting indicator that are of a network slice in a network slice list shown in the table. Further, based on different first information, the load information of a V2X service may further include more or less load information than that in Table 2c. Optionally, the foregoing table may further include any one or more of the following: a cause of a measurement failure, a measurement object that fails to be measured, and a load type that fails to be measured.

Further, the first radio access network node may not send the first information to the second radio access network node, and the second radio access network node determines independently whether to send the load information to the first radio access network node. For example, if it is stipulated in a communications protocol that the second radio access network node periodically sends the load information of the first load type of the second radio access network node to the first radio access network node or sends the load information of the first load type of the second radio access network node to the first radio access network node when the trigger condition is met, the second radio access network node may send the load information of the first load type to the first radio access network node according to the periodicity stipulated in the protocol or when the trigger condition is met. In this case, the first load type may be a default load type, for example, a load type stipulated in the protocol. For example, the first load type may include all the foregoing load types, or may include only the network slice load, the V2X load, and the UL/SUL load that are with a relatively coarse granularity.

In a possible implementation, the first radio access network node may send a request to the second radio access network node, to request to hand over a terminal device served by the first radio access network node to the second radio access network node. For example, if the first radio access network node determines, based on load information of the first radio access network node, a V2X service on an air interface is overloaded, and load of a V2X service of the second radio access network node on an air interface is relatively light, the first radio access network node requests to hand over a terminal device that is served by the first radio access network node and that has the V2X service to the second radio access network node.

Optionally, the foregoing request may include the first load type, to indicate a cause for the handover, that is, a cause value of the handover. The cause for the handover may include public load balancing (load balancing without distinguishing a load type) and/or load balancing of the first load type. The load balancing of the first load type includes any one or more of load balancing of a network slice type, load balancing of an uplink carrier type, and load balancing of a V2X type. For example, the handover request sent by the first radio access network node includes indication information of a cause for the load balancing of the V2X type, to indicate that the handover is requested because V2X service of the first radio access network node is overloaded. In this case, the second radio access network node may perform handover admission control based on the information. For example, the second radio access network node may infer, based on the indication information of the V2X load, that a terminal device that is requested for the handover to the second radio access network node may have a V2X service. The second radio access network node may determine, based on load of a current V2X service of the second radio access network node, whether to receive the terminal device that is requested for the handover.

Figure 3A:
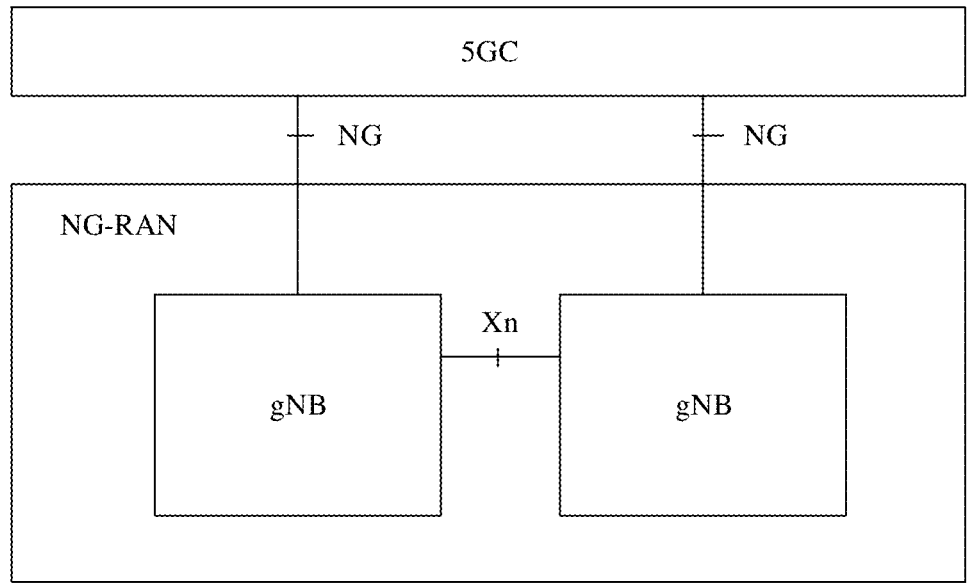
FIG. 3a is a first schematic diagram of a network architecture according to an embodiment.

The load balancing method provided in the embodiments may be applied to a network architecture shown in FIG. 3a. The first radio access network node may be a first general base station (general node B, gNB) in an NR system, and the second radio access network node is a second gNB adjacent to the first gNB. Data transmission may be performed between gNBs through an Xn interface. For example, the first gNB may send, to the second gNB through the Xn interface, first information used to obtain load information and a handover request. The second gNB may send the load information of a first load type of the second gNB to the first gNB through the Xn interface. For example, the load information that is of the first load type and that is sent by the second gNB may be sent by using an XnAP message, for example, a terminal device-associated signaling message (UE-associated) or a non-terminal device-associated signaling message (non UE-associated). For example, the load information of the first load type may be sent by using a resource status request, resource status response (resource status response), resource status failure, or resource status update message. Further, a new Xn interface message may also be defined to send the load information.

In another possible implementation, the first radio access network node may further determine a cell handover parameter and/or a dedicated priority based on the load information of the first load type of the second radio access network node, and send the cell handover parameter and/or the dedicated priority to a terminal device served by the first radio access network node, so that the terminal device performs cell reselection based on a cell reselection parameter and/or the dedicated priority. The cell reselection parameter and the dedicated priority are described in detail in the following embodiments.

Figure 3B:
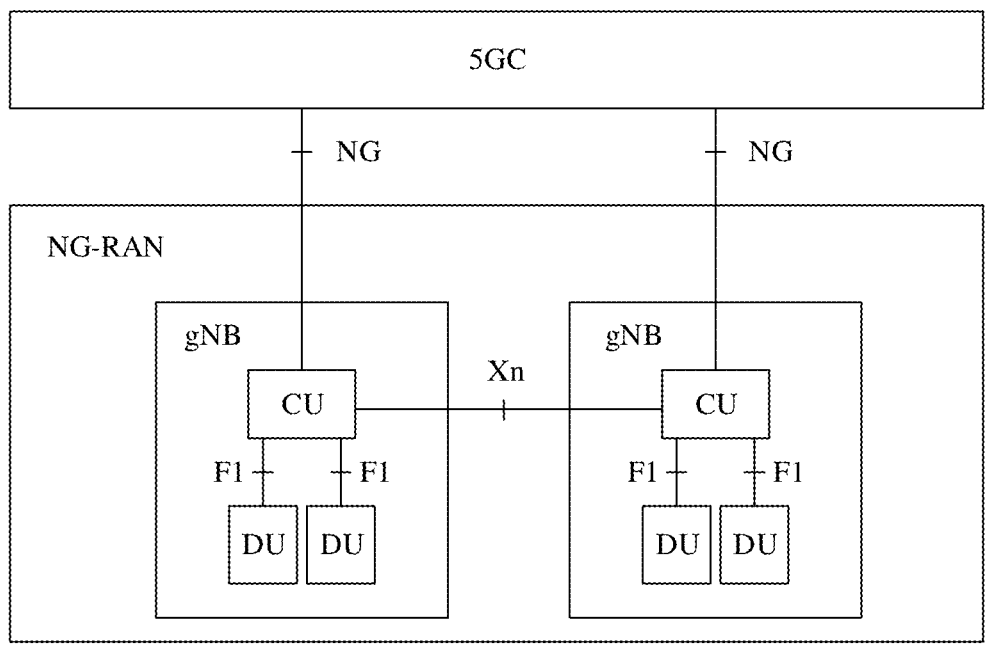
FIG. 3b is a second schematic diagram of a network architecture according to an embodiment.

The foregoing method may be further applicable to a distributed base station shown in FIG. 3b. A gNB may include a centralized unit radio access network node (CU) and at least one distributed unit radio access network node (DU). A CU and a DU may communicate with each other through an F1 interface. A CU may communicate with another CU through an Xn interface. In a possible implementation, functions at and above a packet data convergence protocol (PDCP) layer, such as at the PDCP layer, a radio resource control (RRC) layer, and a service data adaptation protocol (SDAP) layer, are set in the CU; and functions below the PDCP layer, such as at a radio link control protocol (RLC) layer, a media access control layer (MAC), and a physical layer (PHY), are set in the DU.

A first radio access network node may be a first CU in a gNB, and a second radio access network node may be a second CU in a neighboring gNB. In this embodiment, a process of interaction between the first CU and the second CU is similar to that in the foregoing embodiment. Load information that is of a first load type and that is sent by the second CU may be load information of the second CU, or load information of the second CU and one or more DUs managed by the second CU. For example, if the first CU requests to obtain a PRB utilization rate of a neighboring cell 1, the second CU determines that the neighboring cell 1 is a cell of a DU 3 managed by the second CU, and the second CU obtains the PRB utilization rate of the cell 1 from the DU 3, and sends the PRB utilization rate to the first CU. Optionally, the first CU may send the obtained PRB utilization rate of the neighboring cell 1 to one or more DUs managed by the first CU. Optionally, a process in which the second CU obtains the PRB utilization rate of the cell 1 may be finished before the second CU receives the request from the first CU. For example, the DU 3 sends load information of the cell of the DU 3 periodically to the second CU, or sends load information of the cell of the DU 3 to the second CU when a trigger condition is met. For another example, if the first CU requests to obtain a PRB utilization rate of a V2X service of the second CU, the second CU obtains in advance a PRB utilization rate of a V2X service of each DU managed by the second CU, then the second CU determines, based on the PRB utilization rate of the V2X service of each DU managed by the second CU, the PRB utilization rate of the V2X service of the second CU, and sends the PRB utilization rate to the first CU. When the first radio access network node is a gNB, and the second radio access network node is a CU of a neighboring gNB, a process of exchanging the load information of the first load type between the two radio access network nodes is similar to the foregoing process, and details are not described herein again.

In addition, the foregoing method may also be applied between a CU and a DU in a gNB. For example, the first radio access network node is the CU, and the second radio access network node is the DU; or the first radio access network node is the DU, and the second radio access network node is the CU.

For example, the first radio access network node is a CU 1 shown in FIG. 3b, and the second radio access network node is a DU 1 shown in FIG. 3b. The CU 1 may send first information to the DU 1, to request the DU 1 to report load information of a first load type periodically, or to report load information of a first load type when a trigger condition is met. Optionally, the DU 1 may also actively report or update the load information of the first load type to the CU 1. In this case, the DU 1 may independently determine a periodicity of reporting or the trigger condition, to further determine whether to perform reporting and how to perform reporting. The first information may include indication information of the first load type, a sending periodicity, the trigger condition, or the like, which is similar to that in the foregoing embodiments, and details are not described herein again. The DU 1 sends the load information of the first load type of the DU 1 to the CU 1 based on the first information. Alternatively, the DU 1 may send the load information to the CU 1 according to a specification in a protocol and a preset periodicity, or send the load information to the CU 1 when the trigger condition is met. For example, the DU 1 may send the load information of the first load type to the CU 1 by using an F1AP message, such as a terminal device-associated signaling message (UE-associated), or a non-terminal device-associated signaling message (non UE-associated). Further, a new F1 interface message may further be defined to send the foregoing load information.

After receiving the load information that is of the first load type and that is sent by the DU 1, the CU 1 may perform load balancing based on the load information of the DU 1. For example, if the CU 1 determines, based on UL/SUL load information sent by the DU 1, that a UL and a SUL of the DU 1 are overloaded, or if the CU 1 receives UL/SUL overload indication information sent by the DU 1, a terminal device in the DU 1 may be handed over to another DU managed by the CU 1. If the another DU managed by the CU 1 also has relatively heavy load and is not suitable for receiving the terminal device to be handed over, and UL/SUL load of a DU managed by a CU 2 is relatively light, the CU 1 may send a handover request to the CU 2, to request to hand over the terminal in the DU 1 to the CU 2.

Alternatively, the CU 1 may determine a handover policy of the CU 1 based on load information of a DU managed by the CU 1. For example, if the CU 1 determines, based on load information sent by the DU 1, a DU 2, and the like, that current load of the CU 1 is relatively heavy, and, if the CU 1 receives, from the CU 2 in this case, a handover request used to request to hand over a terminal device in the CU 2 to the CU 1, the CU 1 may reject to receive the terminal device in the CU 2.

When the foregoing method is applied between the CU and the DU, a process of exchanging the load information of the first load type between the CU and the DU is similar to the foregoing process of interaction between base stations. The first load type is also similar to the foregoing first load type in the foregoing interaction process between base stations, and includes one or more of the following: load of a network slice, load of a network slice group, load of services having a same QoS requirement in a single network slice, total load of V2X services, load of a V2X service on an air interface, load of a V2X service on a sidelink, load of a V2X service on each frequency, load of V2X on each frequency on an air interface, load of a V2X service on each frequency on a sidelink, load of V2X services having a same QoS requirement, and load of a UL and/or a SUL. If the CU (or the DU) further sends the first information, the first information may include indication information of one or more of the foregoing load types, that is, the indication information of the first load type.

However, measurement objects vary in load type. When the first radio access network node is a CU, and the second radio access network node is a DU, load information sent by the DU is a measurement result of a measurement object that can be measured by the DU, and the measurement object that can be measured by the DU may include one or more of the following: a radio resource status, an ABS status, a channel state, and a CAC. When the first radio access network node is a DU, and the second radio access network node is a CU, load information sent by the CU is a measurement result of a measurement object that can be measured by the CU, and the measurement object that can be measured by the CU may include one or more of the following: hardware load, transport network layer load, and reference signal received power (for example, the CU may send a received RSRP measurement report to the DU).

In a possible implementation, when the first radio access network node is a CU, and the second radio access network node is a DU, if the DU needs to collect statistics about load of a V2X service, the CU may further send frequency information and/or QoS information supported by the V2X service to the DU.

The load information that is of the first load type and that is sent between the CU and the DU may be sent by using an F1AP message, for example, a terminal device-associated signaling message (UE-associated) or a non-terminal device-associated signaling message (non UE-associated). For example, the load information is sent by using a resource status request/response/failure/update message. Further, a new F1 interface message may also be defined to send the load information.

After obtaining load information of all cells of the DU, the CU may determine a cell reselection parameter and/or a dedicated priority based on the load information, and send the cell reselection parameter and/or the dedicated priority to the DU. The DU may broadcast the cell reselection parameter and/or the dedicated priority to a terminal device, so that the terminal device performs cell reselection based on the cell reselection parameter and/or the dedicated priority. The cell reselection parameter and the dedicated priority are described in detail in the following embodiments.

In a possible implementation, the DU may include a relay device. In other words, the method may be applied to a multi-hop relay scenario, or a scenario in which transmission is performed between the DU and the terminal device by using the relay device.

In a possible implementation, the CU and the DU may alternatively be a CU and a DU in a CU-DU split architecture in LTE.

Figure 3C:
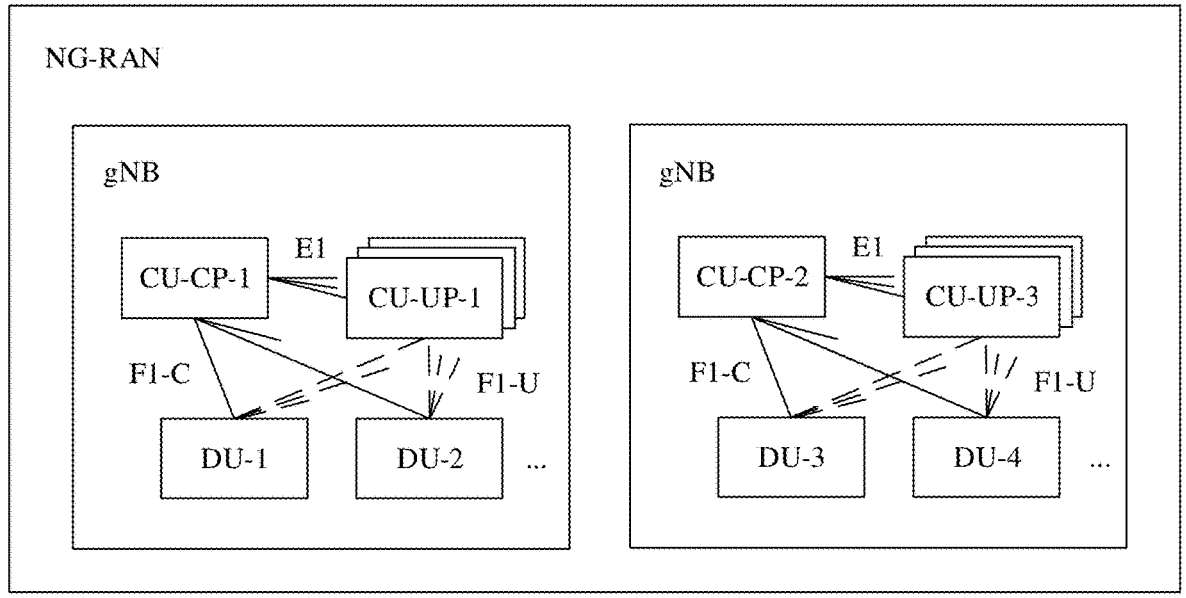
FIG. 3*c* is a third schematic diagram of a network architecture according to an embodiment.

The foregoing load balancing method may be further applicable to a distributed base station shown in FIG. 3c. A CU is further divided into a control plane centralized unit radio access network node (CU-CP) and a user plane centralized unit radio access network node (CU-UP). The CU-CP may communicate with the CU-UP through an E1 interface, the CU-CP may communicate with a DU through a user plane F1-C interface, the CU-UP may communicate with the DU through a user plane F1-U interface, and the CU-CP may communicate with another CU-CP through an Xn interface. For example, in this embodiment, the CU-CP may include a PDCP layer and an RRC layer, and the CU-UP includes a PDCP layer and a service data adaptation protocol (SDAP) layer. For example, the SDAP layer may be responsible for QoS-related access, including confirmation of QoS flow-to-DRB routing and identifiers (IDs) of uplink and downlink QoS flows.

A first radio access network node may be a first CU-CP in a gNB, and a second radio access network node may be a second CU-CP in a neighboring gNB. In this embodiment, a process of interaction between the first CU-CP and the second CU-CP is similar to a process of interaction between base stations and a process of interaction between CUs. Details are not described herein again. The load information that is of a first load type and that is sent by the second CU-CP may be load information of the second CU-CP, load information of at least one CU-UP managed by the second CU-CP, and load information of at least one DU managed by the second CU-CP. In addition, the first radio access network node may alternatively be a gNB, and the second radio access network node may be a CU-CP of a neighboring gNB. A process of exchanging load information of a first load type between the two radio access network nodes is similar to the foregoing process, and details are not described herein again.

In addition, the foregoing method may also be applied between a CU-CP and a CU-UP managed by the CU-CP. For example, the first radio access network node is the CU-CP, and the second radio access network node is the CU-UP; or the first radio access network node is the CU-UP, and the second radio access network node is the CU-CP.

For example, the first radio access network node is a CU-CP 1 shown in FIG. 3c, and the second radio access network node is a CU-UP 1 shown in FIG. 3c. The CU-CP 1 may send first information to the CU-UP 1, to request the CU-UP 1 to report load information of a first load type periodically, or to report load information of a first load type when a trigger condition is met. Optionally, the CU-UP 1 may also actively report or update the load information of the first load type to the CU-CP 1. In this case, the CU-UP 1 may independently determine a periodicity of reporting or the trigger condition, to further determine whether to perform reporting and how to perform reporting. The first information may include indication information of the first load type, a sending periodicity, the trigger condition, or the like (the first load type, a sending periodicity, or the trigger condition is similar to that in the foregoing embodiments, and details are not described herein again). The CU-UP 1 sends the load information of the first load type of the CU-UP 1 to the CU-CP 1 based on the first information. Alternatively, the CU-UP 1 may send the load information to the CU-CP 1 according to a specification in a protocol and a preset periodicity, or send the load information to the CU-CP 1 when the trigger condition is met. For example, the CU-UP 1 may send the load information of the first load type to the CU-CP 1 by using an E1AP message. Further, a new E1 interface message may further be defined to send the foregoing load information.

After receiving the load information that is of the first load type and that is sent by the CU-UP 1, the CU-CP 1 may perform load balancing based on the load information of the CU-UP 1. For example, if the CU-CP 1 determines, based on load information of a V2X service on an air interface sent by the CU-UP1, that the V2X service of the CU-UP 1 on the air interface is overloaded, or if the CU-CP 1 receives V2X service overload indication information on the air interface sent by the CU-UP 1, a terminal device served by the CU-UP 1 may be handed over to another CU-UP 1 managed by the CU-CP 1. If the another CU-UP 1 managed by the CU-CP 1 also has relatively heavy load and is not suitable for receiving the terminal device to be handed over, and load of a V2X service on an air interface of a CU-UP 1 managed by a CU-CP 2 is relatively light, the CU-CP 1 may send a handover request to the CU-CP 2, to request to hand over the terminal in the CU-UP 1 to the CU-CP 2.

Alternatively, the CU-CP 1 may determine a handover policy of the CU-CP 1 based on load information of the CU-UP 1 managed by the CU-CP 1. For example, if the CU-CP 1 determines, based on load information sent by the CU-UP 1, a CU-UP 2, and the like, that current load of the CU-CP 1 is relatively heavy, and if the CU-CP 1 receives, from the CU-CP 2 in this case, a handover request used to request to hand over a terminal device in the CU-CP 2 to the CU-CP 1, the CU-CP 1 may reject to receive the terminal device in the CU-CP 2.

When the foregoing method is applied between the CU-CP and the CU-UP, the load type of the load information exchanged between the first radio access network node and the second radio access network node is the same as the load type of the load information exchanged between base stations, and may include one or more of the following: load of a network slice, load of a network slice group, load of services having a same QoS requirement in a single network slice, load of a V2X service, load of a V2X service on an air interface, load of a V2X service on a sidelink, load of V2X services on a same frequency, load of V2X services having a same QoS requirement, and load of a UL and/or a SUL.

However, measurement objects vary in load type. When the first radio access network node is a CU-CP, and the second radio access network node is a CU-UP, load information of a first load type sent by the CU-UP may include hardware load of the first load type and/or transport network layer load of the first load type. When the first radio access network node is a CU-UP, and the second radio access network node is a CU-CP, load information of a first load type sent by the CU-CP may include one or more of the following: hardware load of the first load type, transport network layer load of the first load type, and reference signal received power of the first load type (for example, the CU-CP may send a received RSRP measurement report to the CU-UP).

An embodiment further provides a load balancing method, to implement relatively fine-grained load balancing, that is, to meet different load requirements for a UL/SUL, a network slice, or different V2X services. The load balancing method provided in this embodiment may be applied to an NR system or another future communications system.

Figure 4:
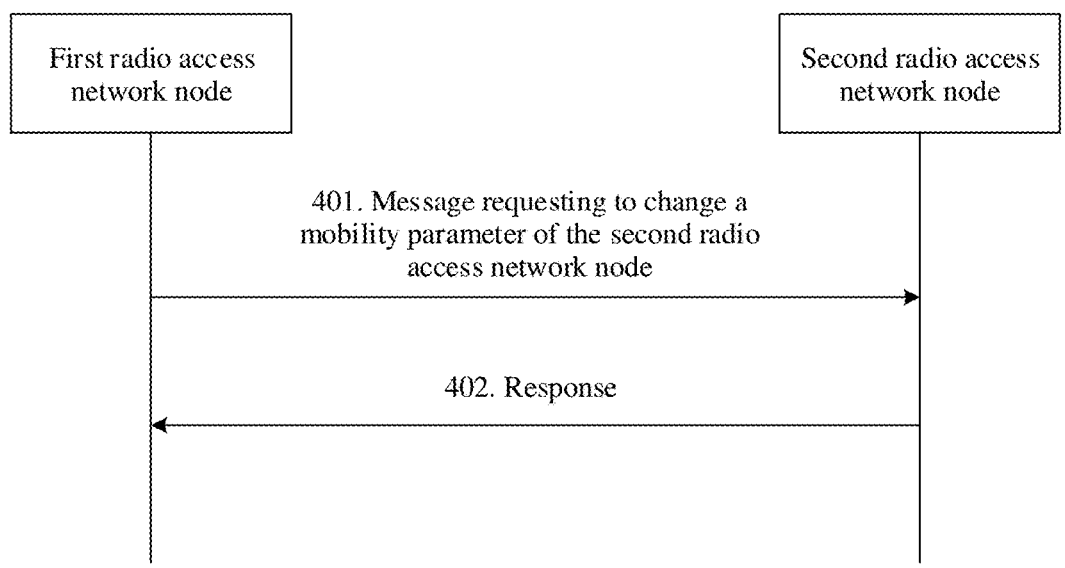
FIG. 4 is a second schematic flowchart of a load balancing method according to an embodiment.

FIG. 4 is a schematic flowchart of a load balancing method according to an embodiment. As shown in the figure, the method may include the following steps.

Step 401: A first radio access network node sends a second message to a second radio access network node, where the second message is used to request the second radio access network node to change a mobility parameter of a first load type of the second radio access network node. Similar to the foregoing embodiments, the first load type may include one or more of the following: load of a network slice, load of a network slice group, load of services having a same QoS requirement in a single network slice, load of a V2X service, load of a V2X service on an air interface, load of a V2X service on a sidelink, load of a V2X service on each frequency, load of a V2X service on each frequency on an air interface, load of a V2X service on each frequency on a sidelink, load of V2X services having a same QoS requirement, and load of a UL and/or a SUL.

In a process of implementing load balancing, a base station (cell) may send the mobility parameter information to a terminal device served by the base station (cell), and the terminal device determines, based on the mobility parameter, whether cell handover or cell reselection needs to be performed. In step 401, the second message sent by the first radio access network node to the second radio access network node may include handover trigger change information of the first load type of the second radio access network node. For example, the second message includes any one or more of a cell identifier of the first radio access network node, a cell identifier of the second radio access network node, mobility parameter information of the first radio access network node, and information about a mobility parameter recommended to be changed by the second radio access network node. The mobility parameter of the first radio access network node is a mobility parameter of a first load type that is currently configured by the first radio access network node, and the mobility parameter recommended to be changed by the second radio access network node is a mobility parameter of the first load type recommended to be changed by the second radio access network node. The mobility parameter of the first radio access network node and the mobility parameter recommended to be changed by the second radio access network node include handover trigger change information (for example, handover trigger change), for example, a handover trigger change value compared with a current value, for example, the handover trigger change value is a handover trigger change value of the first load type granularity. For example, when a network slice is overloaded, the mobility parameter requested to be changed may be a neighboring cell specific offset (or cell individual offset, CIO) of a measurement event (for example, A3 or A5). When a SUL/UL is overloaded, the mobility parameter requested to be changed may be a CIO of a measurement event (for example, A3). Further, another parameter may also be requested to be changed. This is not limited in the embodiments. In addition, optionally, the message may further include a cause value indicating a cause for triggering the mobility parameter change, for example, a dual connectivity operation or a handover operation. The second radio access network node determines, based on the cause value, which type of mobility parameter needs to be changed.

Optionally, the message may include the mobility parameter, of the first load type, that is requested to be changed by the second radio access network node, that is, the mobility parameter that is expected by the first radio access network node and that is to be changed by the second radio access network node. If load of the first radio access network node is relatively heavy, to effectively prevent a terminal device of the second radio access network node from being handed over to the first radio access network node, the first radio access network node may send, to the second radio access network node, the mobility parameter that is expected by the first radio access network node and that is to be changed by the second radio access network node.

It may be understood that the mobility parameter information is mobility parameter information of a first load type granularity. For example, mobility parameter information varies in network slice (group), SUL/UL, and V2X.

Optionally, the message may further include common mobility parameter information, that is, a common mobility parameter of the first radio access network node and/or a common mobility parameter recommended to be changed by the second radio access network node. The common mobility parameter indicates a mobility parameter without distinguishing a load type.

For example, the second message may reuse a mobility parameter change request (mobility change request) message in LTE, or may use an XnAP message in NR, or may use a newly defined XnAP message. This is not limited in the embodiments. Alternatively, the second message may have another name. This is not limited in the embodiments.

Step 402: The first radio access network node receives a response from the second radio access network node.

The second radio access network node may change the requested mobility parameter of the first load type based on the message that is for requesting the change of the mobility parameter and that is received from the first radio access network node, return the response to the first radio access network node, and send a changed mobility parameter to the terminal device of the second radio access network node, to increase difficulty for handing over the terminal device of the second radio access network node to the first radio access network node.

Similar to the foregoing embodiments, the first load type may include one or more of the following: load of a network slice, load of a network slice group, load of services having a same QoS requirement in a single network slice, load of a V2X service, load of a V2X service on an air interface, load of a V2X service on a sidelink, load of a V2X service on each frequency, load of a V2X service on each frequency on an air interface, load of a V2X service on each frequency on a sidelink, load of V2X services having a same QoS requirement, and load of a UL and/or a SUL.

Optionally, if the second radio access network node successfully changes the mobility parameter of the second radio access network node based on the message that is for requesting the change of the mobility parameter and that is sent by the first radio access network node, the second radio access network node returns a response message to the first radio access network node. Optionally, the response message includes indication information of the first load type, and the indication information of the first load type is used to indicate the mobility parameter of the first load type that is successfully changed.

Optionally, if the second radio access network node fails to change the mobility parameter based on the message that is for requesting the change of the mobility parameter and that is sent by the first radio access network node, the second radio access network node returns a failure message to the first radio access network node. Optionally, the mobility parameter modification failure message includes indication information of the first load type, and the indication information of the first load type is used to indicate the mobility parameter of the first load type that fails to be changed. Optionally, the second radio access network node may further add a modifiable range of the mobility parameter to the failure message, and send the failure message to the first radio access network node, so that the first radio access network node resends the message for requesting the change of the mobility parameter based on the modifiable range, or gives up changing the mobility parameter of the second radio access network node. For example, the second radio access network node adds, to the failure message, the modifiable range of the mobility parameter of the first load type that fails to be changed, and sends the failure message to the first radio access network node. The modifiable range of the mobility parameter may be a handover trigger change lower limit (handover trigger change lower limit). If the second radio access network node changes some mobility parameters successfully and fails to change some parameters, the second radio access network node may indicate, to the first radio access network node, only information about the mobility parameters that fail to be changed, which is similar to the foregoing description. Alternatively, the second radio access network node may separately indicate mobility parameters that fail to be changed and mobility parameters that are changed successfully.

Optionally, the failure message may further include a modifiable range of the common mobility parameter.

It may be understood that the modifiable range of the mobility parameter is a modifiable range of a mobility parameter of a first load type granularity. For example, a modifiable range of a mobility parameter varies in network slice, SUL/UL, and V2X.

If the second radio access network node determines, based on the message that is for requesting the change of the mobility parameter and that is sent by the first radio access network node, that a plurality of parameters need to be changed, and some parameters are successfully changed but some parameters fail to be changed during the change, the second radio access network node may add, to the response, indication information of the parameters that fail to be changed, and send the response to the first radio access network node. Optionally, a modifiable range of the mobility parameters that fail to be changed may be sent to the first radio access network node, so that the first radio access network node resends the message for requesting the change of the mobility parameter based on the modifiable range, or gives up changing the mobility parameters.

For example, the response message may reuse a mobility change acknowledge message or a mobility change failure message in LTE, or use an existing XnAP message in NR, or use a newly defined XnAP message. This is not limited in the embodiments. Alternatively, the response message may have another name. This is not limited in the embodiments.

For example, the first load type may include one or more of the following: load of a network slice, load of a network slice group, load of services having a same QoS requirement in a single network slice, total load of V2X services, load of a V2X service on an air interface, load of a V2X service on a sidelink, load of a V2X service on each frequency, load of V2X on each frequency on an air interface, load of a V2X service on each frequency on a sidelink, load of V2X services having a same QoS requirement, and load of a UL and/or a SUL.

For example, the first radio access network node sends, to the second radio access network node, a message for requesting change of a mobility parameter of network slice (group) load of the second radio access network node, where the message may include one or more of mobility parameter information of a network slice (group) of the first radio access network node, information about a network slice (group) mobility parameter recommended to be changed by the second radio access network node, common mobility parameter information of the first radio access network node, and information about a common mobility parameter recommended to be changed by the second radio access network node. Information element formats of the mobility parameter information of the network slice (group) and/or the common mobility parameter information are shown in Table 3a and Table 3b.

TABLE 3a

| IE/Group Name Information element |
|---|
| Common Handover Trigger Change Common handover trigger change |
| Handover Trigger Change List Handover trigger change list |
| > Handover Trigger Change Handover trigger change |
| > S-NSSAI or S-NSSAI list Single network slice or single network slice list |

TABLE 3b

| IE/Group Name Information element |
|---|
| Handover Trigger Change List Handover trigger change list |
| > Handover Trigger Change Handover trigger change |
| > S-NSSAI or S-NSSAI list Single network slice or single network slice list |

After receiving the foregoing message, if the change succeeds, the second radio access network node returns a mobility change response message to the first radio access network node. Otherwise, if the change fails, the second radio access network node returns a mobility parameter change failure message, where the mobility change failure message includes a mobility parameter change range of the network slice (group) and/or a common mobility parameter change range, as shown in Table 4a and Table 4b.

TABLE 4a

| IE/Group Name Information element |
|---|
| Common Handover Trigger Change Limit Common handover trigger change limit |
| > Common Handover Trigger Change Lower Limit Common handover trigger change lower limit |
| > Common Handover Trigger Change Upper Limit Common handover trigger change upper limit |
| Handover Trigger Change Limit List Handover trigger change limit list |
| > Handover Trigger Change Lower Limit Handover trigger change lower limit |
| > Handover Trigger Change Upper Limit Handover trigger change upper limit |
| > S-NSSAI or S-NSSAI list Single network slice or single network slice list |

TABLE 4b

| IE/Group Name Information element |
|---|
| Handover Trigger Change Limit List Handover trigger change limit list |
| > Handover Trigger Change Lower Limit Handover trigger change lower limit |
| > Handover Trigger Change Upper Limit Handover trigger change upper limit |
| > S-NSSAI or S-NSSAI list Single network slice or single network slice list |

For another example, the first radio access network node sends, to the second radio access network node, a message for requesting change of a mobility parameter of network slice (group) load of the second radio access network node, where the message includes one or more of mobility parameter delta information of a network slice (group) of the first radio access network node, delta information about a network slice (group) mobility parameter recommended to be changed by the second radio access network node, common mobility parameter delta information of the first radio access network node, delta information about a common mobility parameter recommended to be changed by the second radio access network node, common mobility parameter information of the first radio access network node, and information about a common mobility parameter recommended to be changed by the second radio access network node. The mobility parameter delta information of the network slice (group) and/or the common mobility parameter information is/are shown in Table 5a.

TABLE 5a

| IE/Group Name Information element |
|---|
| Common Handover Trigger Change Common handover trigger change |
| Handover Trigger Change List Handover trigger change list |
| > Delta Handover Trigger Change Handover trigger change delta |
| > S-NSSAI or S-NSSAI list Single network slice or single network slice list |

After receiving the foregoing message, if the change succeeds, the second radio access network node returns a mobility change response message to the first radio access network node. Otherwise, if the change fails, the second radio access network node returns a mobility parameter change failure message, where the mobility change failure message includes a mobility parameter change range of the network slice (group) and/or a common mobility parameter change range, as shown in Table 5b.

TABLE 5b

| IE/Group Name Information element |
| --- |
| Common Handover Trigger Change Limit Common handover trigger change limit |
| > Common Handover Trigger Change Lower Limit Common handover trigger change lower limit |
| > Common Handover Trigger Change Upper Limit Common handover trigger change upper limit |
| Handover Trigger Change Limit List Handover trigger change limit list |
| > Delta Handover Trigger Change Lower Limit Handover trigger change delta lower limit |
| > Delta Handover Trigger Change Upper Limit Handover trigger change delta upper limit |
| > S-NSSAI or S-NSSAI list Single network slice or single network slice list |

In the foregoing scenarios, the cause value in the second message sent by the first radio access network node to the second radio access network node may be a cause value related to load balancing of network slice load, for example, enhanced mobile broadband (eMBB), ultra-reliable low-latency communication (URLLC), or the internet of things (IoT). For another example, the first radio access network node sends, to the second radio access network node, a message for requesting change of a mobility parameter of a SUL of the second radio access network node, where the message may include one or more of mobility parameter information of an uplink carrier of the first radio access network node, information about an uplink carrier mobility parameter recommended to be changed by the second radio access network node, common mobility parameter information of the first radio access network node, and information about a common mobility parameter recommended to be changed by the second radio access network node. An information element format of the uplink carrier is shown in Table 6a.

TABLE 6a

| IE/Group Name Information element |
| --- |
| > Handover Trigger Change for SUL UEs Handover trigger change for terminal devices of a SUL |
| > Handover Trigger Change for NUL UEs Handover trigger change for terminal devices of a normal UL (normal UL, NUL) |

After receiving the foregoing message, if the change succeeds, the second radio access network node returns a mobility change response message to the first radio access network node. Otherwise, if the change fails, the second radio access network node returns a mobility parameter change failure message, where the mobility change failure message includes a mobility parameter change range of the SUL/NUL (normal UL), as shown in Table 6b.

TABLE 6b

| IE/Group Name Information element |
| --- |
| > Handover Trigger Change Lower Limit for SUL UE Handover trigger change lower limit for terminal devices of a SUL |
| > Handover Trigger Change Upper Limit for SUL UE Handover trigger change upper limit for terminal devices of a SUL |
| > Handover Trigger Change Lower Limit for NUL UE Handover trigger change lower limit for terminal devices of a NUL |
| > Handover Trigger Change Upper Limit for NUL UE Handover trigger change upper limit for terminal devices of a NUL |

In this scenario, the cause value in the second message sent by the first radio access network node to the second radio access network node may be a cause value related to load balancing of a UL/SUL granularity.

The change of the mobility parameter of the UL/SUL may also include common mobility parameter change information and delta mobility change information, which is similar to the network slice (group) information. Details are not described herein again.

For example, the first radio access network node sends, to the second radio access network node, a message for requesting change of a mobility parameter of a V2X service (group) and V2X service frequency (group) load, where the message may include one or more of mobility parameter information of a V2X service (group) of the first radio access network node, information about a V2X (group) mobility parameter recommended to be changed by the second radio access network node, common mobility parameter information of the first radio access network node, and information about a common mobility parameter recommended to be changed by the second radio access network node. An information element format of the V2X is shown in Table 7a.

TABLE 7a

| IE/Group Name Information element |
| --- |
| Handover Trigger Change List Handover trigger change list |
| > Handover Trigger Change Handover trigger change |
| > V2X frequency V2X service frequency |

After receiving the foregoing message, if the change succeeds, the second radio access network node returns a mobility change response message to the first radio access network node. Otherwise, if the change fails, the second radio access network node returns a mobility parameter change failure message, where the mobility change failure message includes a mobility parameter change range of the V2X service (group) and/or a V2X service frequency mobility parameter change range, as shown in Table 7b.

TABLE 7b

| IE/Group Name Information element |
| --- |
| Handover Trigger Change Limit List Handover trigger change limit list |
| > Handover Trigger Change Lower Limit Handover trigger change lower limit |
| > Handover Trigger Change Upper Limit Handover trigger change upper limit |
| > V2X frequency V2X service frequency |

The V2X frequency in Table 7a and Table 7b may also be replaced with a V2X service or V2X QoS, that is, represents load of V2X services having a same QoS requirement.

In this scenario, the cause value in the second message sent by the first radio access network node to the second radio access network node may be a cause value related to load balancing of a V2X frequency, V2X service, or a V2X QoS granularity.

The change of the mobility parameter of the V2X service load may also include common mobility parameter change information and delta mobility change information, which is similar to the network slice (group) granularity. Details are not described herein again.

For example, the first radio access network node sends, to the second radio access network node, a message for requesting change of a mobility parameter of UE capability load, where the message may include one or more of mobility parameter information of UE capability load of the first radio access network node, information about a UE capability load mobility parameter recommended to be changed by the second radio access network node, common mobility parameter information of the first radio access network node, and information about a common mobility parameter recommended to be changed by the second radio access network node. An information element format of the UE capability load is shown in Table 8a.

TABLE 8a

| IE/Group Name Information element |
|---|
| Handover Trigger Change List Handover trigger change list |
| > Handover Trigger Change Handover trigger change |
| > UE capability ID or UE capability ID list UE capability ID or UE capabilities list |

After receiving the foregoing message, if the change succeeds, the second radio access network node returns a mobility change response message to the first radio access network node. Otherwise, if the change fails, the second radio access network node returns a mobility parameter change failure message, where the mobility change failure message includes a mobility parameter change range of the UE capability load, as shown in Table 8b.

TABLE 8b

| IE/Group Name Information element |
|---|
| Handover Trigger Change Limit List Handover trigger change limit list |
| > Handover Trigger Change Lower Limit Handover trigger change lower limit |
| > Handover Trigger Change Upper Limit Handover trigger change upper limit |
| > UE capability ID or UE capability ID list UE capability ID or UE capability list |

In this scenario, the cause value in the mobility change message sent by the first radio access network node to the second radio access network node may be a cause value related to load balancing of the UE capability load. For example, a service type may be supported by the UE capability. This is not limited in the embodiments.

The change of the mobility parameter of the UE capability load may also include common mobility parameter change information and delta mobility change information, which is similar to the network slice (group) granularity. Details are not described herein again.

In the foregoing embodiments, the first radio access network node may be a source base station, and the second radio access network node may be a target base station. Optionally, the source base station and the target base station may also be applicable in a multi-link data transmission scenario. The source base station may be used as a primary base station, and the target base station may be used as a secondary base station. Optionally, the first radio access network node may also be a CU, and the second radio access network node is a neighboring CU. Alternatively, the first radio access network node may be a CU-CP, and the second radio access network node is a neighboring CU-UP.

An embodiment further provides a load balancing method, to implement relatively fine-grained load balancing, that is, to meet different load requirements for a UL/SUL, a network slice, or different V2X services. The load balancing method provided in this embodiment may be applied to an NR system or another future communications system.

Figure 5:
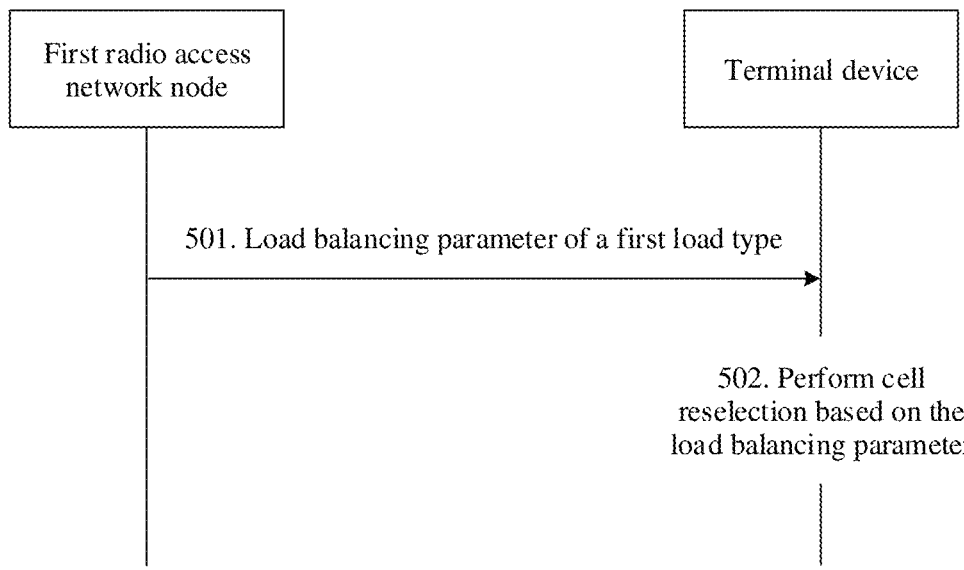
FIG. 5 is a third schematic flowchart of a load balancing method according to an embodiment.

FIG. 5 is a schematic flowchart of the load balancing method according to the embodiment. As shown in the figure, the method may include the following steps.

Step 501: A first radio access network node sends a load balancing parameter of a first load type to a terminal device.

Similar to the foregoing embodiments, the first load type may include one or more of the following: load of a network slice, load of a network slice group, load of services having a same QoS requirement in a single network slice, load of a V2X service, load of a V2X service on an air interface, load of a V2X service on a sidelink, load of V2X services on a same frequency, load of V2X services having a same QoS requirement, and load of a UL and/or a SUL.

The load balancing parameter of the first load type may include a cell reselection parameter and/or a dedicated priority. For example, the cell reselection parameter includes a cell reselection parameter of a network slice (group) type, a cell reselection parameter of a UL/SUL type, and/or a cell reselection parameter of a V2X type; and the dedicated priority includes a dedicated priority of a network slice (group) type, a dedicated priority of a UL/SUL type, and/or a dedicated priority of a V2X type.

The cell reselection parameter may include a parameter oriented to a specific cell (for example, an offset value Qoffset of a target cell in a criterion R), that is, the first radio access network node changes the Qoffset of the specific cell. For example, the Qoffset may be of a network slice (group) granularity, that is, different network slices (groups) in the specific cell may have different Qoffsets. Optionally, the first radio access network node may send a Qoffset of a network slice to the terminal device. Alternatively, the Qoffset may be of a UL/SUL granularity, that is, SULs and ULs in the specific cell may have different Qoffsets. Alternatively, the Qoffset may be of a V2X service frequency granularity, that is, different frequencies of a V2X service in the specific cell may be specifically different Qoffsets.

It may be understood that the terminal device sorts candidate reselection cells based on the cell reselection parameter to select the best cell. For example, the terminal device selects, based on a cell reselection parameter of a network slice (group) granularity, a network slice (group) of an appropriate cell to perform data transmission; the terminal device selects, based on a cell reselection parameter of an uplink carrier granularity, an uplink carrier of an appropriate cell to perform data transmission; or the terminal device selects, based on a cell reselection parameter of a V2X frequency granularity, a V2X frequency of an appropriate cell to perform data transmission.

Optionally, the first radio access network node may send information about a network slice supported by the first radio access network node and/or information about a V2X frequency to the terminal device.

For example, a Qoffset of a network slice is used as an example. The first radio access network node determines a Qoffset 1 of a network slice 1, a Qoffset 2 of a network slice 2, a Qoffset 3 of a network slice 3, and the like that are of a neighboring cell 1. The first radio access network node determines a Qoffset 1' of a network slice 1, a Qoffset 2' of a network slice 2, a Qoffset 3' of a network slice 3, and the like that are of a neighboring cell 2. The first radio access network node sends an identifier (for example, a PCI or a CGI) of the cell, an identifier (for example, S-NSSAI) of a network slice and a corresponding Qoffset to the terminal device. The terminal device selects, based on received Qoffsets of a plurality of neighboring cells, a proper cell and a network slice in the cell for data transmission.

When the first load type is the network slice (group) load type, the dedicated priority is priorities of different network slices (groups), and the terminal device may select, based on the priorities of the different network slices (groups), a proper network slice (group) for service transmission. When the first load type is the V2X service load, the dedicated priority may be priorities of different frequencies in a V2X service, and the terminal device may select, based on the priorities of the different V2X frequencies, a proper frequency for V2X service transmission. When the first load type is the UL/SUL load, the dedicated priority may be priorities of ULs and SULs, and the terminal device selects, based on the priorities of the ULs and the SULs, an appropriate UL or SUL for uplink data transmission.

For example, a dedicated priority of a network slice is used as an example. The first radio access network node determines a priority of each network slice based on load of network slices supported in each cell. The first radio access network node may send an identifier of each network slice (for example, single network slice selection load information (S-NSSAI)) and a priority of a network slice to the terminal device.

In some embodiments, before performing the foregoing step 501, the first radio access network node may first measure load information of a terminal device in an idle state and/or a terminal device in a deactivated state in a cell of the first radio access network node. Optionally, the measurement of the load information may be implemented by counting a quantity of the terminal device in the idle state and/or the terminal device in the deactivated state that is/are of the first load type, to determine the load balancing parameter of the first load type.

In a possible implementation, before performing step 501, the first radio access network node may further first obtain load information of a first load type of a radio access network node such as a neighboring base station, a neighboring CU, or a neighboring CU-CP. A process of obtaining the load information is similar to that in the foregoing embodiments, and details are not described herein again. Then, the first radio access network node determines the load balancing parameter of the first load type of the first radio access network node based on the obtained load information of the first load type of the another radio access network node.

Optionally, the first radio access network node may send the load balancing parameter of the first load type to the terminal device by using a broadcast message, or may send the load balancing parameter of the first load type by using another newly defined message. This is not limited in the embodiments.

Step 502: The terminal device performs cell reselection based on the load balancing parameter.

When load balancing is performed on the terminal device in the idle state and the terminal device in the deactivated state by using the foregoing method, network slice load, V2X load, and UL/SUL load are all considered. Compared with an existing load balancing method, the load information considered in this method is load information with a relatively fine granularity, so that the load balancing can be performed based on a load status of a network slice (group), a load status of a V2X service, or a load status of a UL/SUL. This method can meet a load balancing requirement in an NR system or another future system, and helps improve a success rate of the load balancing and system efficiency.

For example, the foregoing three load balancing methods provided in the embodiments may also be combined with each other. For example, the first radio access network node may obtain the load information of the first load type of the second radio access network node. Then, the first radio access network node may change the load balancing parameter (the cell reselection parameter and/or the dedicated priority) of the first radio access network node based on the load information of the second radio access network node, so that the terminal device in the idle state and the terminal device in the deactivated state that are of the first radio access network node perform cell reselection based on a changed load balancing parameter. For another example, the first radio access network node may obtain the load information of the first load type of the second radio access network node. Then, the first radio access network node may change the load balancing parameter (the cell reselection parameter and/or the dedicated priority) of the first radio access network node based on the load information of the second radio access network node, so that the terminal device in the idle state and the terminal device in the deactivated state that are of the first radio access network node perform cell reselection based on a changed load balancing parameter. In addition, the first radio access network node may further request to change the mobility parameter of the second radio access network node, to reduce terminal devices handed over from the second radio access network node to the first radio access network node. That the first radio access network node changes the load balancing parameter of the first radio access network node and that the first radio access network node requests to change the mobility parameter of the second radio access network node may be interchanged in sequence. For another example, the first radio access network node may obtain the load information of the first load type of the second radio access network node. Then, the first radio access network node may request to change the mobility parameter of the second radio access network node, to reduce terminal devices handed over from the second radio access network node to the first radio access network node. For another example, the first radio access network node receives a request that is sent by the second radio access network node and that requests to change a mobility parameter of the first load type of the first radio access network node. The first radio access network node changes the load balancing parameter of the first load type of the first radio access network node based on the request, to reduce reselection of the terminal device in the idle state and the terminal device in the deactivated state that are of the first radio access network node to the second radio access network node.

Figure 6:
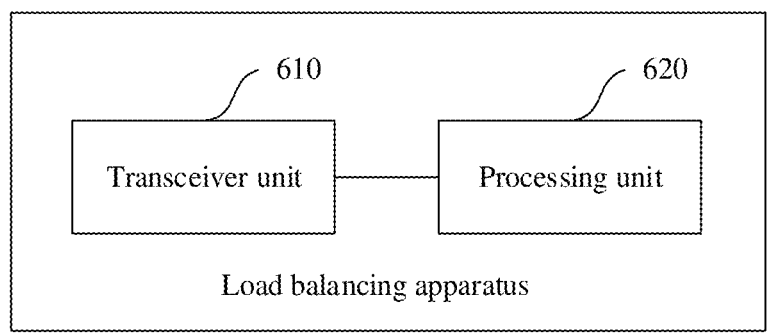
FIG. 6 is a first schematic structural diagram of a load balancing apparatus according to an embodiment.

Based on a same concept, an embodiment further provides a load balancing apparatus, configured to implement a function of the first radio access network node in the foregoing method embodiments. As shown in FIG. 6, the apparatus may include a transceiver unit 610 and a processing unit 620.

The transceiver unit is configured to receive a first message from a second radio access network node, where the first message includes load information of a first load type of the second radio access network node, and the first load type includes any one or more of the following: network slice load, vehicle-to-everything V2X load, and supplementary uplink (SUL) load.

The processing unit is configured to obtain the load information of the first load type.

In a possible implementation, the transceiver unit is further configured to send first information to the second radio access network node, where the first information is used to obtain the load information of the first load type of a second radio access network node.

In a possible implementation, the first information further includes a sending periodicity of the load information of the first load type; or the first information further includes a trigger condition for sending the load information of the first load type.

In a possible implementation, load information of the network slice load includes: an identifier of a single network slice and a load status of the single network slice, and/or an identifier of a network slice group and a load status of the network slice group; and/or load information of the V2X load includes V2X frequency information, and the load information of the V2X load further includes any one or more of the following: a load status of V2X corresponding to the V2X frequency information on an air interface, a load status of a V2X service corresponding to the V2X frequency information on a sidelink, and load statuses of V2X services having same quality of service QoS; and/or load information of the SUL load includes: a frequency of the supplementary uplink and load of the supplementary uplink.

In a possible implementation, the load status includes a measurement result of any one or more of the following measurement objects: a quantity of accessed terminal devices, hardware load, transmission load, a reference signal received power measurement report, a radio resource status, ABS status information, an available resource, a channel state information report, and access cell control information.

In a possible implementation, the measurement result includes a measured value and/or overload indication information.

In a possible implementation, the transceiver unit is further configured to send a request to the second radio access network node, where the request is used to request to hand over a terminal device served by the first radio access network node to the second radio access network node, the request includes indication information of the first load type, and the indication information of the first load type is used to indicate a cause for the handover.

In a possible implementation, the apparatus is a centralized unit CU, and the second radio access network node is a distributed unit DU, or the apparatus is a DU, and the second radio access network node is a CU.

The CU has functions of any one or more of the following protocol layers: a packet data convergence protocol, radio resource control, and a service data adaptation protocol. The DU has functions of any one or more of the following protocol layers: a radio link layer control protocol, a media access control layer, and a physical layer. The CU and the DU belong to a same radio base station.

In a possible implementation, load information of a first load type of the DU includes one or more of the following: a radio resource status of the first load type, an almost blank subframe ABS status of the first load type, a channel state information report of the first load type, and cell access control information of the first load type; or load information of a first load type of the CU includes one or more of the following: hardware load of the first load type, transmission load of the first load type, and a reference signal received power measurement report of the first load type.

In a possible implementation, the first radio access network node is a control plane centralized unit radio access network node CU-CP, and the second radio access network node is a user plane centralized unit radio access network node CU-UP; or the first radio access network node is a user plane centralized unit radio access network node CU-UP, and the second radio access network node is a control plane centralized unit radio access network node CU-CP; and the CU-CP and the CU-UP belong to a same radio base station.

In a possible implementation, load information of a first load type of the CU-UP includes hardware load of the first load type and/or transmission load of the first load type; or load information of a first load type of the CU-CP includes one or more of the following: hardware load of the first load type, transmission load of the first load type, and a reference signal received power measurement report of the first load type.

Figure 7:
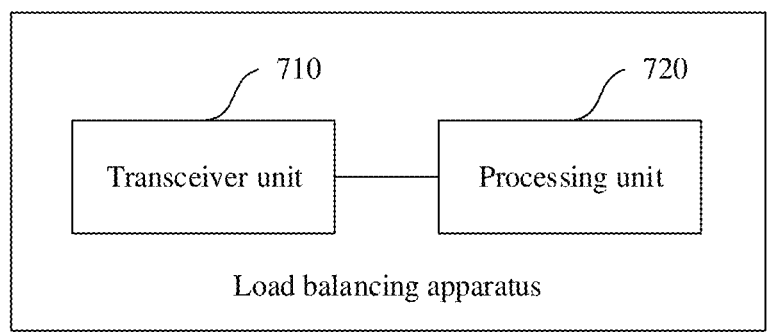
FIG. 7 is a second schematic structural diagram of a load balancing apparatus according to an embodiment.

Based on a same concept, an embodiment further provides a load balancing apparatus, configured to implement a function of the second radio access network node in the foregoing method embodiments. As shown in FIG. 7, the apparatus may include a transceiver unit 710 and a processing unit 720.

The transceiver unit 710 is configured to send, under control of the processing unit 720, a first message to a first radio access network node, where the first message includes load information of a first load type, and the first load type includes any one or more of the following: network slice load, vehicle-to-everything V2X load, and SUL load.

In a possible implementation, the transceiver unit is further configured to receive first information from the first radio access network node, where the first information is used to obtain the load information of the first load type of the second radio access network node.

In a possible implementation, the first information further includes a sending periodicity of the load information of the first load type; or the first information further includes a trigger condition for sending the load information of the first load type.

In a possible implementation, load information of the network slice load includes: an identifier of a single network slice and a load status of the single network slice, and/or an identifier of a network slice group and a load status of the network slice group; and/or load information of the V2X load includes V2X frequency information, and the load information of the V2X load further includes any one or more of the following: a load status of V2X corresponding to the V2X frequency information on an air interface, a load status of a V2X service corresponding to the V2X frequency information on a sidelink, and load statuses of V2X services having same QoS; and/or load information of the SUL load includes: a frequency of the supplementary uplink and load of the supplementary uplink.

In a possible implementation, the load status includes a measurement result of any one or more of the following measurement objects: a quantity of accessed terminal devices, hardware load, transmission load, a reference signal received power measurement report, a radio resource status, ABS status information, an available resource, a channel state information report, and access cell control information.

In a possible implementation, the measurement result includes a measured value and/or overload indication information.

In a possible implementation, the transceiver unit is further configured to receive a request from the first radio access network node, where the request is used to request to hand over a terminal device served by the first radio access network node to the second radio access network node, the request includes indication information of the first load type, and the indication information of the first load type is used to indicate a cause for the handover.

In a possible implementation, the first radio access network node is a centralized unit CU, and the second radio access network node is a distributed unit DU, or the first radio access network node is a DU, and the second radio access network node is a CU.

The CU has any one or more of the following protocol layers: a packet data convergence protocol, radio resource control, and a service data adaptation protocol. The DU has any one or more of the following protocol layers: a radio link layer control protocol, a media access control layer, and a physical layer. The CU and the DU belong to a same radio base station.

In a possible implementation, load information of a first load type of the DU includes one or more of the following: a radio resource status of the first load type, an almost blank subframe ABS status of the first load type, a channel state information report of the first load type, and cell access control information of the first load type; or load information of a first load type of the CU includes one or more of the following: hardware load of the first load type, transmission load of the first load type, and a reference signal received power measurement report of the first load type.

In a possible implementation, the first radio access network node is a control plane centralized unit radio access network node CU-CP, and the second radio access network node is a user plane centralized unit radio access network node CU-UP; or the first radio access network node is a user plane centralized unit radio access network node CU-UP, and the second radio access network node is a control plane centralized unit radio access network node CU-CP; and the CU-CP and the CU-UP belong to a same radio base station.

In a possible implementation, load information of a first load type of the CU-UP includes hardware load of the first load type and/or transmission load of the first load type; or load information of a first load type of the CU-CP includes one or more of the following: hardware load of the first load type, transmission load of the first load type, and a reference signal received power measurement report of the first load type.

An embodiment further provides a communications system. The communications system may include the load balancing apparatus shown in FIG. 6 and the load balancing apparatus shown in FIG. 7.

Figure 8:
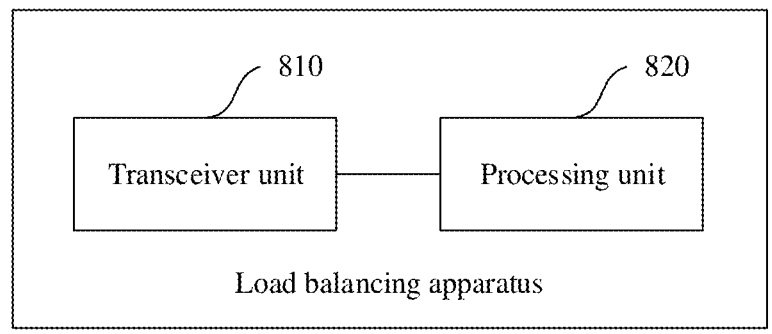
FIG. 8 is a third schematic structural diagram of a load balancing apparatus according to an embodiment.

Based on a same concept, an embodiment further provides a load balancing apparatus, configured to implement a function of the first radio access network node in the foregoing method embodiments. As shown in FIG. 8, the apparatus may include a transceiver unit 810 and a processing unit 820.

The transceiver unit is configured to receive a second message from a first radio access network node, where the second message is used to request a second radio access network node to change a mobility parameter of a first load type of the second radio access network node, and the first load type includes any one or more of the following: network slice load, vehicle-to-everything V2X load, and supplementary uplink SUL load.

The processing unit is configured to change the mobility parameter of the second radio access network node based on the second message.

The transceiver unit is further configured to send a response to the first radio access network node.

In a possible implementation, information about the mobility parameter includes handover trigger change information.

In a possible implementation, the message includes information about the mobility parameter that is of the first load type and that is requested to be changed by the second radio access network node.

In a possible implementation, the response includes indication information used to indicate that the second radio access network node successfully changes the mobility parameter; or the response includes a mobility parameter change range of the first load type of the second radio access network node.

In a possible implementation, the network slice load includes load of a single network slice and/or load of a network slice group; and/or the V2X load includes one or more of the following: load of a V2X service on an air interface, load of a V2X service on a sidelink, load of a V2X service on each frequency, load of a V2X service on each frequency on an air interface, load of a V2X service on each frequency on a sidelink, and load of V2X services having same QoS.

Based on a same concept, an embodiment further provides a load balancing apparatus, configured to implement a function of the first radio access network node in the foregoing method embodiments. The apparatus may be the first radio access network node in the foregoing method embodiments, or may be a chip disposed in the first radio access network node.

Figure 9:
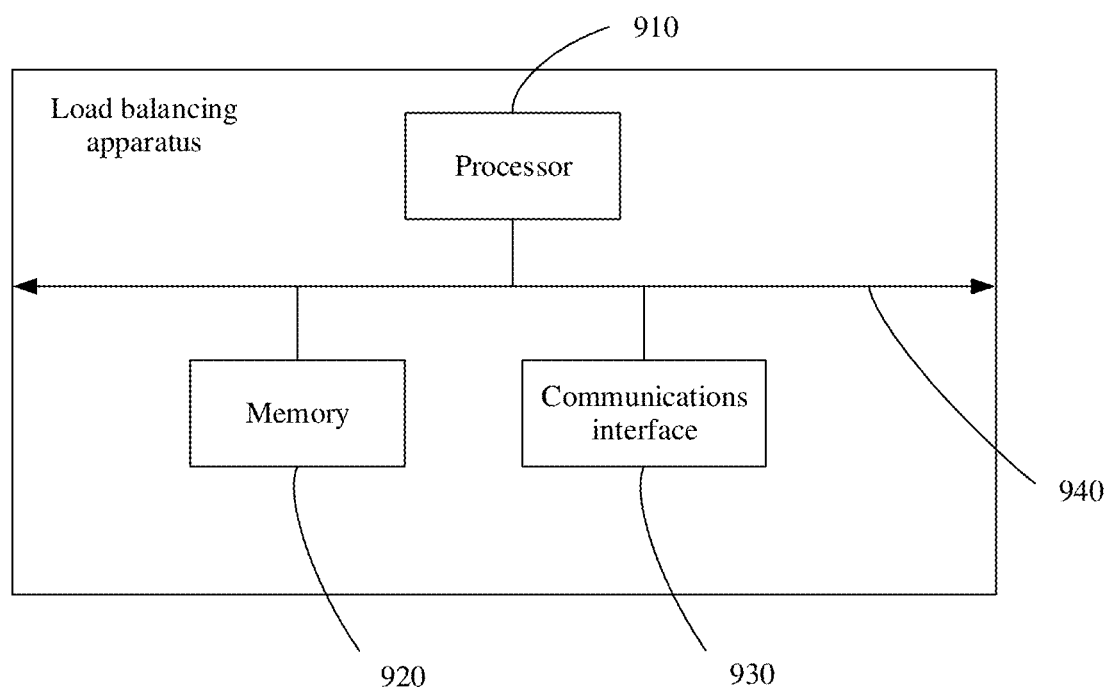
FIG. 9 is a fourth schematic structural diagram of a load balancing apparatus according to an embodiment.

When the apparatus is the first radio access network node, as shown in FIG. 9, the apparatus may include a processor 910, a memory 920, and a communications interface 930, and optionally, may further include a bus 940. The processor 910 may be configured to: execute an instruction in the memory 920, and implement the function of the first radio access network node in the foregoing method embodiments through the communications interface 930.

For example, the processor 910 may be a general-purpose CPU, a microprocessor, an ASIC, or one or more integrated circuits configured to control program execution of the solutions.

The communications bus 940 may include a path for transferring information between the foregoing components.

The communications interface 930 is configured to communicate with another device or a communications network, such as Ethernet, a radio access network, or a wireless local area network by using any apparatus such as a transceiver.

The memory 920 may be a read-only memory or another type of static storage device that can store static information and an instruction, a random access memory or another type of dynamic storage device that can store information and an instruction, an electrically erasable programmable read-only memory, a compact disc read-only memory or another compact disc storage, optical disc storage, or magnetic disk storage medium or another magnetic storage device, any other medium that can be used to carry or store expected program code in a form of an instruction or a data structure and that can be accessed by a computer, or the like. This is not limited herein. The memory 920 may exist independently, and is connected to the processor 910 by using the bus. Alternatively, the memory 920 may be integrated with the processor 910.

The memory 920 is configured to store application program code for performing the solutions in the embodiments, and the application program code is executed under control of the processor 910. The processor 910 is configured to execute the application program code stored in the memory 920, to implement the load balancing method according to the foregoing embodiments.

Alternatively, optionally, in this embodiment, the processor 910 may perform a related function in the load balancing method provided in the foregoing embodiments, and the communications interface 930 is responsible for communication with another device or a communications network. This is not limited in this embodiment.

During specific implementation, in an embodiment, the processor 910 may include one or more CPUs.

During specific implementation, in an embodiment, the network device may include a plurality of processors. Each of the processors may be a single-core processor, or may be a multi-core processor. The processor herein may refer to one or more devices, circuits, and/or processing cores configured to process data (for example, a computer program instruction).

When the apparatus is a chip disposed in the first radio access network node, the communications interface may be an input/output interface.

Figure 10:
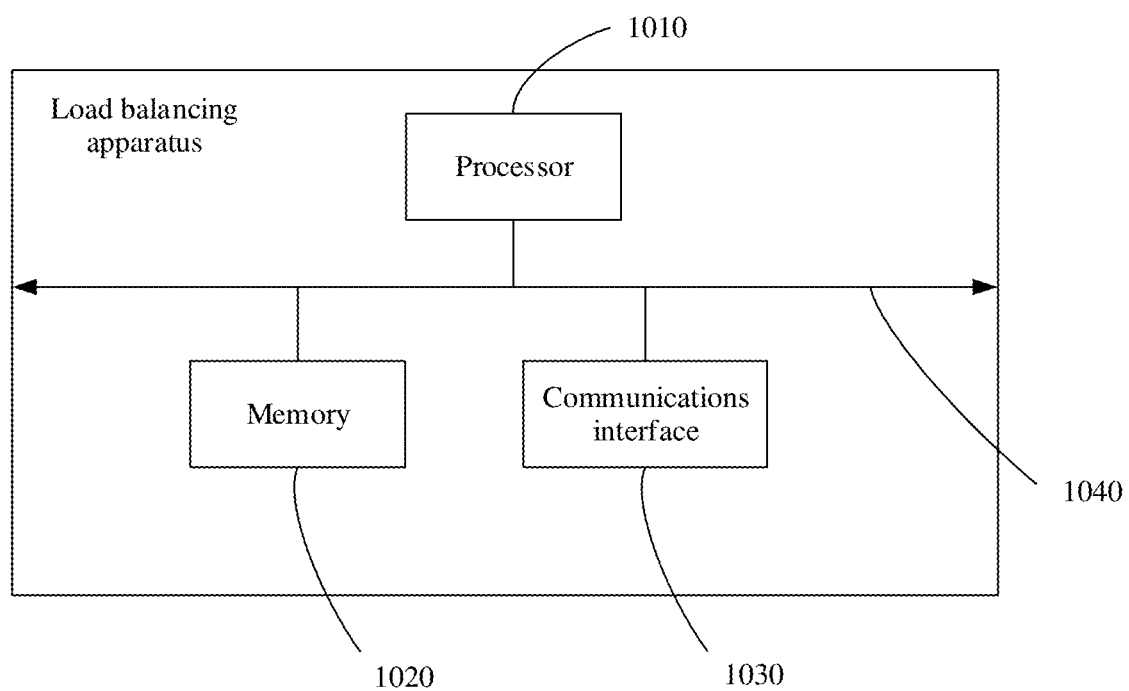
FIG. 10 is a fifth schematic structural diagram of a load balancing apparatus according to an embodiment.

Based on a same concept, an embodiment further provides a load balancing apparatus, configured to implement a function of the second radio access network node in the foregoing method embodiments. The apparatus may be the second radio access network node in the foregoing method embodiments, or may be a chip disposed in the second radio access network node. As shown in FIG. 10, the apparatus may include a processor 1010, a memory 1020, a communications interface 1030, and optionally, may further include a bus 1040. The processor 1010 may be configured to: execute an instruction in the memory 1020, and implement the function of the second radio access network node in the foregoing method embodiments through the communications interface 1030.

When the apparatus is the second radio access network node, as shown in FIG. 10, the apparatus may include a processor 1010, a memory 1020, and a communications interface 1030, and optionally, may further include a bus 1040. The processor 1010 may be configured to: execute an instruction in the memory 1020, and implement the function of the second radio access network node in the foregoing method embodiments through the communications interface 1030.

For example, the processor 1010 may be a general-purpose CPU, a microprocessor, an ASIC, or one or more integrated circuits configured to control program execution of the solutions.

The communications bus 1040 may include a path for transferring information between the foregoing components.

The communications interface 1030 is configured to communicate with another device or a communications network, such as Ethernet, a radio access network, or a wireless local area network by using any apparatus such as a transceiver.

The memory 1020 may be a read-only memory or another type of static storage device that can store static information and an instruction, a random access memory or another type of dynamic storage device that can store information and an instruction, an electrically erasable programmable read-only memory, a compact disc read-only memory or another compact disc storage, optical disc storage, or magnetic disk storage medium or another magnetic storage device, any other medium that can be used to carry or store expected program code in a form of an instruction or a data structure and that can be accessed by a computer, or the like. This is not limited herein. The memory 1020 may exist independently, and is connected to the processor 1010 by using the bus. Alternatively, the memory 1020 may be integrated with the processor 1010.

The memory 1020 is configured to store application program code for performing the solutions in the embodiments, and the application program code is executed under control of the processor 1010. The processor 1010 is configured to execute the application program code stored in the memory 1020, to implement the load balancing method according to the foregoing embodiments.

Alternatively, optionally, in this embodiment, the processor 1010 may perform a related function in the load balancing method provided in the foregoing embodiments, and the communications interface 1030 is responsible for communication with another device or a communications network. This is not limited in this embodiment.

During specific implementation, in an embodiment, the processor 1010 may include one or more CPUs.

During specific implementation, in an embodiment, the network device may include a plurality of processors. Each of the processors may be a single-core processor, or may be a multi-core processor. The processor herein may be one or more devices, circuits, and/or processing cores configured to process data (for example, a computer program instruction).

When the apparatus is a chip disposed in the second radio access network node, the communications interface may be an input/output interface.

An embodiment provides a communications system, including the apparatus shown in FIG. 9 and the apparatus shown in FIG. 10.

An embodiment provides a computer-readable storage medium. The computer-readable storage medium stores a computer instruction. When the instruction is run on a computer, the computer is enabled to perform a function of the first radio access network node or a function of the second radio access network node in the foregoing method embodiments.

An embodiment provides a computer program product including an instruction. When the computer program product runs on a computer, the computer is enabled to perform a function of the first radio access network node or a function of the second radio access network node in the foregoing method embodiments.

A person of ordinary skill in the art can make various modifications and variations to the embodiments without departing from the spirit and scope of the embodiments. The embodiments are intended to cover these modifications and variations and their equivalent technologies.

What is claimed is:

1. A load balancing method comprising:

receiving, by a first radio access network node, a first message from a second radio access network node, wherein the first message comprises load information of a first load type of the second radio access network node, and the first load type comprises any one or more of the following: a network slice load, a vehicle-to-everything (V2X) load, or a supplementary uplink (SUL) load;

obtaining, by the first radio access network node, the load information of the first load type; and performing load balancing based on the obtained load information, wherein the load balancing meets different load requirements for the network slice load, the V2X load, and the SUL load.

2. The method according to claim 1, further comprising:

sending, by the first radio access network node, first information to the second radio access network node, wherein the first information is used to obtain the load information of the first load type of the second radio access network node.

3. The method according to claim 2, wherein the first information further comprises:
- a sending periodicity of the load information of the first load type; or
- a trigger condition for sending the load information of the first load type.

4. The method according to claim 1, wherein load information of the network slice load comprises:
- an identifier of a single network slice and a load status of the single network slice, and/or
- an identifier of a network slice group and a load status of the network slice group; and/or
- load information of the V2X load comprises V2X frequency information, and the load information of the V2X load further comprises any one or more of the following:
- a load status of a V2X service corresponding to the V2X frequency information on an air interface,
- a load status of a V2X service corresponding to the V2X frequency information on a sidelink, or
- load statuses of V2X services having same quality of service (QoS); and/or
- load information of the SUL load comprises:
- a frequency of a supplementary uplink and load of the supplementary uplink.

5. The method according to claim 1, wherein the load information comprises a measurement result of any one or more of the following measurement objects:
- a quantity of accessed terminal devices,
- a hardware load,
- a transmission load,
- a reference signal received power measurement report,
- a radio resource status,
- Almost Blank Subframe (ABS) status information,
- an available resource,
- a channel state information report, or
- access cell control information.

6. The method according to claim 5, wherein the measurement result comprises a measured value and/or overload indication information.

7. The method according to claim 1, further comprising:
- sending, by the first radio access network node, a request to the second radio access network node, wherein the request is used to request to hand over a terminal device served by the first radio access network node to the second radio access network node, the request comprises indication information of the first load type, and the indication information of the first load type is used to indicate a cause for the handover.

8. An apparatus applied to a first radio access network node, comprising:
- at least one processor and a memory storing instructions for execution by the at least one processor;
- wherein, when executed, the instructions cause the apparatus to perform operations comprising:
- receiving a first message from a second radio access network node, wherein the first message comprises load information of a first load type of the second radio access network node, and the first load type comprises any one or more of the following: a network slice load, a vehicle-to-everything £V2X load, or a supplementary uplink (SUL) load;
- obtaining the load information of the first load type;
- performing load balancing based on the obtained load information, wherein the load balancing meets different load requirements for the network slice load, the V2X load, and the SUL load.

9. The apparatus according to claim 8, wherein, when executed, the instructions cause the apparatus to perform operations comprising:
- sending first information to the second radio access network node, wherein the first information is used to obtain the load information of the first load type of the second radio access network node.

10. The apparatus according to claim 9, wherein the first information further comprises:
- a sending periodicity of the load information of the first load type; or
- a trigger condition for sending the load information of the first load type.

11. The apparatus according to claim 8, wherein load information of the network slice load comprises:
- an identifier of a single network slice and a load status of the single network slice, and/or
- an identifier of a network slice group and a load status of the network slice group; and/or
- load information of the V2X load comprises V2X frequency information, and the load information of the V2X load further comprises any one or more of the following:
- a load status of a V2X service corresponding to the V2X frequency information on an air interface,
- a load status of a V2X service corresponding to the V2X frequency information on a sidelink, or
- load statuses of V2X services having same quality of service (QoS); and/or
- load information of the SUL load comprises: a frequency of a supplementary uplink and load of the supplementary uplink.

12. The apparatus according to claim 8, wherein the load information comprises a measurement result of any one or more of the following measurement objects:
- a quantity of accessed terminal devices,
- a hardware load,
- a transmission load,
- a reference signal received power measurement report,
- a radio resource status,
- Almost Blank Subframe (ABS) status information,
- an available resource,
- a channel state information report, or
- access cell control information.

13. The apparatus according to claim 12, wherein the measurement result comprises a measured value and/or overload indication information.

14. The apparatus according to claim 8, wherein, when executed, the instructions cause the apparatus to perform operations comprising:
- sending a request to the second radio access network node, wherein the request is used to request to hand over a terminal device served by the apparatus to the second radio access network node, the request comprises indication information of the first load type, and the indication information of the first load type is used to indicate a cause for the handover.

15. A non-transitory memory storage medium comprising computer-executable instructions that, when executed, facilitate a first radio access network node carrying out operations comprising:
- receiving a first message from a second radio access network node, wherein the first message comprises load information of a first load type of the second radio access network node, and the first load type comprises any one or more of the following: a network slice load, a vehicle-to-everything (V2X) load, or a supplementary uplink (SUL) load;

obtaining, the load information of the first load type;

performing load balancing based on the obtained load information, wherein the load balancing meets different load requirements for the network slice load, the V2X load, and the SUL load.

16. The non-transitory memory storage medium according to claim 15, wherein when the instructions are executed, carrying out operations comprising:

sending first information to the second radio access network node, wherein the first information is used to obtain the load information of the first load type of the second radio access network node.

17. The non-transitory memory storage medium according to claim 16, wherein the first information further comprises:

a sending periodicity of the load information of the first load type; or a trigger condition for sending the load information of the first load type.

18. The non-transitory memory storage medium according to claim 15, wherein load information of the network slice load comprises:

an identifier of a single network slice and a load status of the single network slice, and/or an identifier of a network slice group and a load status of the network slice group; and/or load information of the V2X load comprises V2X frequency information, and the load information of the V2X load further comprises any one or more of the following:

a load status of a V2X service corresponding to the V2X frequency information on an air interface, a load status of a V2X service corresponding to the V2X frequency information on a sidelink, or load statuses of V2X services having same quality of service (QoS); and/or load information of the SUL load comprises: a frequency of a supplementary uplink and load of the supplementary uplink.

19. The non-transitory memory storage medium according to claim 15, wherein the load information comprises a measurement result of any one or more of the following measurement objects:

a quantity of accessed terminal devices, a hardware load, a transmission load, a reference signal received power measurement report, a radio resource status, Almost Blank Subframe (ABS) status information, an available resource, a channel state information report, or access cell control information.

20. The non-transitory memory storage medium according to claim 19, wherein the measurement result comprises a measured value and/or overload indication information.

* * * * *